(12) United States Patent
Tsutsumi et al.

(10) Patent No.: US 10,445,621 B2
(45) Date of Patent: Oct. 15, 2019

(54) IMAGE PROCESSING APPARATUS AND IMAGE PROCESSING METHOD

(71) Applicant: SONY CORPORATION, Tokyo (JP)

(72) Inventors: Tomonori Tsutsumi, Tokyo (JP); Takafumi Morifuji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 15/571,412

(22) PCT Filed: May 6, 2016

(86) PCT No.: PCT/JP2016/063633
§ 371 (c)(1),
(2) Date: Nov. 2, 2017

(87) PCT Pub. No.: WO2016/190062
PCT Pub. Date: Dec. 1, 2016

(65) Prior Publication Data
US 2018/0129909 A1 May 10, 2018

(30) Foreign Application Priority Data
May 22, 2015 (JP) ................................ 2015-104708

(51) Int. Cl.
*G06T 7/90* (2017.01)
*G06T 5/00* (2006.01)
(Continued)

(52) U.S. Cl.
CPC ............ *G06K 9/6247* (2013.01); *G06T 5/003* (2013.01); *G06T 5/008* (2013.01); *G06T 7/90* (2017.01);
(Continued)

(58) Field of Classification Search
USPC .......................................................... 345/582
See application file for complete search history.

(56) References Cited

U.S. PATENT DOCUMENTS

| 2007/0046665 A1* | 3/2007 | Nakagawa | ............... G06T 15/50 345/426 |
| 2008/0252718 A1* | 10/2008 | Provitola | ............ G02B 27/2221 348/42 |

(Continued)

FOREIGN PATENT DOCUMENTS

| CN | 104159023 A | 11/2014 |
| JP | 06-187443 A | 7/1994 |

(Continued)

OTHER PUBLICATIONS

International Search Report and Written Opinion of PCT Application No. PCT/JP2016/063633, dated Jul. 19, 2016, 08 pages of ISRWO.

*Primary Examiner* — Wesner Sajous
(74) *Attorney, Agent, or Firm* — Chip Law Group

(57) ABSTRACT

The present disclosure relates to an image processing apparatus and method capable of reproducing a material feel just like a real thing is there. A reflection characteristic estimation unit estimates and analyzes, from a supplied input image, a reflection characteristic of the subject as a characteristic of a subject. The reflection characteristic estimation unit supplies a specular reflection component as a reflection characteristic estimation result to a characteristic information integrating unit and a highlight area detection unit as an image estimation information. The highlight area detection unit performs highlight area detection in parallel to processing with the reflection characteristic estimation unit by using the specular reflection component as the reflection characteristic estimation result from the reflection characteristic estimation unit, and supplies the highlight area detection result to a characteristic information integrating unit as the image estimation information. The present disclosure is applicable to an image processing apparatus, for example.

14 Claims, 18 Drawing Sheets

(51) Int. Cl.
  *G06T 11/60*  (2006.01)
  *G06K 9/62*  (2006.01)
  *H04N 1/40*  (2006.01)
  *H04N 1/62*  (2006.01)
  *H04N 1/407*  (2006.01)

(52) U.S. Cl.
  CPC ............. *G06T 11/60* (2013.01); *H04N 1/407* (2013.01); *H04N 1/62* (2013.01); *H04N 1/628* (2013.01); *G06T 2207/10004* (2013.01); *G06T 2207/20012* (2013.01); *G06T 2207/20016* (2013.01)

(56) References Cited

U.S. PATENT DOCUMENTS

| | | | |
|---|---|---|---|
| 2011/0274351 A1* | 11/2011 | Tsukada | H04N 1/62 382/167 |
| 2013/0251288 A1 | 9/2013 | Kobiki et al. | |
| 2014/0340415 A1* | 11/2014 | Morifuji | G06T 11/60 345/582 |
| 2015/0248221 A1* | 9/2015 | Sasaki | G06F 3/04845 345/173 |
| 2017/0116885 A1* | 4/2017 | Wilczek | G09B 19/0023 |

FOREIGN PATENT DOCUMENTS

| | | |
|---|---|---|
| JP | 2013-196651 A | 9/2013 |
| JP | 2014-222447 A | 11/2014 |
| WO | 2010/087162 A1 | 8/2010 |

\* cited by examiner

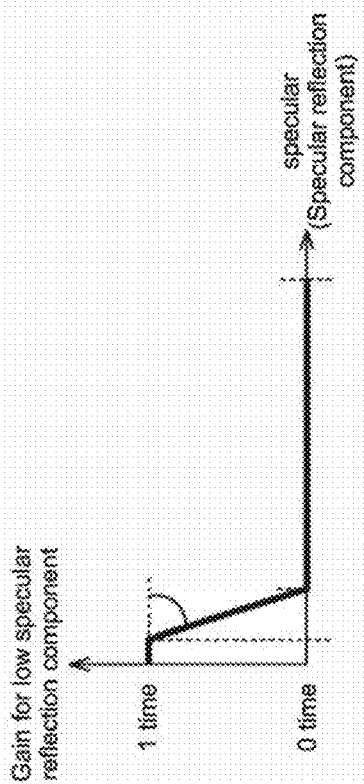
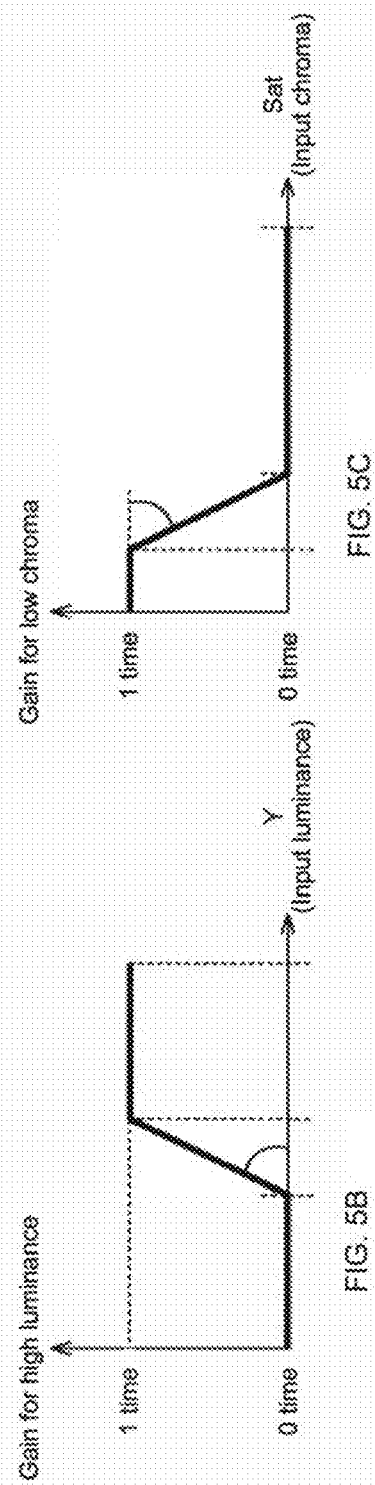
FIG. 5A
FIG. 5B
FIG. 5C

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/063633 filed on May 6, 2016, which claims priority benefit of Japanese Patent Application No. JP 2015-104708 filed in the Japan Patent Office on May 22, 2015. Each of the above-referenced applications is hereby incorporated herein by reference in its entirety.

TECHNICAL FIELD

The present technology relates to an image processing apparatus and an image processing method, and specifically relates to an image processing apparatus and an image processing method capable of reproducing a feel of a material just like a real thing is there.

BACKGROUND ART

For the purpose of enhancing a reality of a video, a technology of adjusting a contrast, delicacy, or the like has been developed.

It should be noted that Patent Literature 1 has proposed a technology that a color correction of an object in an image and a desired color reproduction are achieved to increase image quality.

CITATION LIST

Patent Literature

Patent Literature 1: WO 2010/087162

DISCLOSURE OF INVENTION

Technical Problem

However, there is a limit on performance only by increasing basic image quality such as a contrast and delicacy. In view of this, demanded is reproducing a feel of a material just like a real thing is there, for example, reproducing a situation just like a subject is actually viewed through a video.

The present disclosure has been made in view of the circumstances as described above and makes it possible to reproduce a feel of a material just like a real thing is there.

Solution to Problem

An image processing apparatus according to an aspect of the present disclosure includes: a reflection characteristic estimation unit that estimates a reflection characteristic of a subject of an image; a highlight area detection unit that detects a highlight area in the image by using a reflection characteristic estimation result estimated by the reflection characteristic estimation unit; and a material feel control unit that controls a material feel of the subject in the image by performing a limit process on a basis of the reflection characteristic estimation result and a highlight area detection result detected by the highlight area detection unit with respect to an image in which a reflection area and a highlight area are enhanced, the limit process being based on a difference between the image and the image in which the reflection area and the highlight area are enhanced.

The reflection characteristic estimation result obtained by the reflection characteristic estimation unit is information indicating that the reflection characteristic of the subject is a strong specular reflection component.

The highlight area detection unit can perform detection with an area that satisfies a low specular reflection component area, a high luminance area, and a low chroma area as the highlight area.

The highlight area detection unit can perform detection with an area having a small area which is not excluded by performing area count as the highlight area.

The material feel control unit can include an enhancement process unit that enhances the reflection area and the highlight area on a basis of the reflection characteristic estimation result and the highlight area detection result detected by the highlight area detection unit, and a limit process unit that performs a limit process with respect to the image in which the reflection area and the highlight area are enhanced, the limit process being based on a difference between the image and the image in which the reflection area and the highlight area are enhanced.

The limit process unit can perform the limit process by calculating a suppression gain that suppression is weak with respect to a small area part, and suppression is strong with respect to a large area part on a basis of a result of area count for pixels that the difference exceeds a predetermined limit straight line, and using the calculated suppression gain.

The limit process unit can perform the limit process by using a different limit straight line from the predetermined limit straight line.

The different limit straight line has a limit value changed by an input value.

The limit process unit can perform the limit process by using the predetermined limit straight line.

The material feel control unit can further include a shadow control unit that performs shadow control to lower a luminance around the reflection area and highlight area enhanced in the image.

The shadow control unit can perform the shadow control to lower a luminance around the reflection area and highlight area enhanced in the image by lowering a luminance around a part having a large difference between the image and the image for which the limit process is performed.

The shadow control unit can calculate an application gain to be set strong for the part having the large difference, and performs the shadow control by using the calculated application gain.

The shadow control unit can perform the shadow control with respect to a luminance lower than a drawing start point set by a user.

The shadow control unit can perform the shadow control with respect to a luminance higher than a limit straight line for the shadow control.

An image processing method according to an aspect of the present disclosure includes: by an image processing apparatus, estimating a reflection characteristic of a subject of an image; detecting a highlight area in the image by using an estimated reflection characteristic estimation result; and controlling a material feel of the subject in the image by performing a limit process on a basis of the reflection characteristic estimation result and a detected highlight area detection result with respect to an image in which a reflection area and a highlight area are enhanced, the limit process being based on a difference between the image and the image in which the reflection area and the highlight area are enhanced.

In the aspect of the present disclosure, the reflection characteristic of the subject of the image is estimated, and by using the estimated reflection characteristic estimation result, the highlight area in the image is detected. Further, on a basis of the reflection characteristic estimation result and the detected highlight area detection result, the limit process based on the difference the image and the image where the reflection area and the highlight area are enhanced with respect to the image where the reflection area and the highlight area are enhanced, with the result that the material feel of the subject in the image is controlled.

Advantageous Effects of Invention

According to the aspect of the present disclosure, it is possible to process the image. It is possible to reproduce a feel of a material just like a real thing is there. In particular, it is possible to reproduce the highlight area.

BRIEF DESCRIPTION OF DRAWINGS

FIGS. 5A, 5B, and 5C A diagram for specifically explaining highlight area detection.

MODE(S) FOR CARRYING OUT THE INVENTION

Hereinafter, modes for carrying out the present disclosure (hereinafter, referred to as embodiments) will be described. It should be noted that description will be given in the following order.

1. Outline of present technology
2. First embodiment
3. Second embodiment

<Outline of Present Technology>
[Concept of Present Technology]

Figure 1:
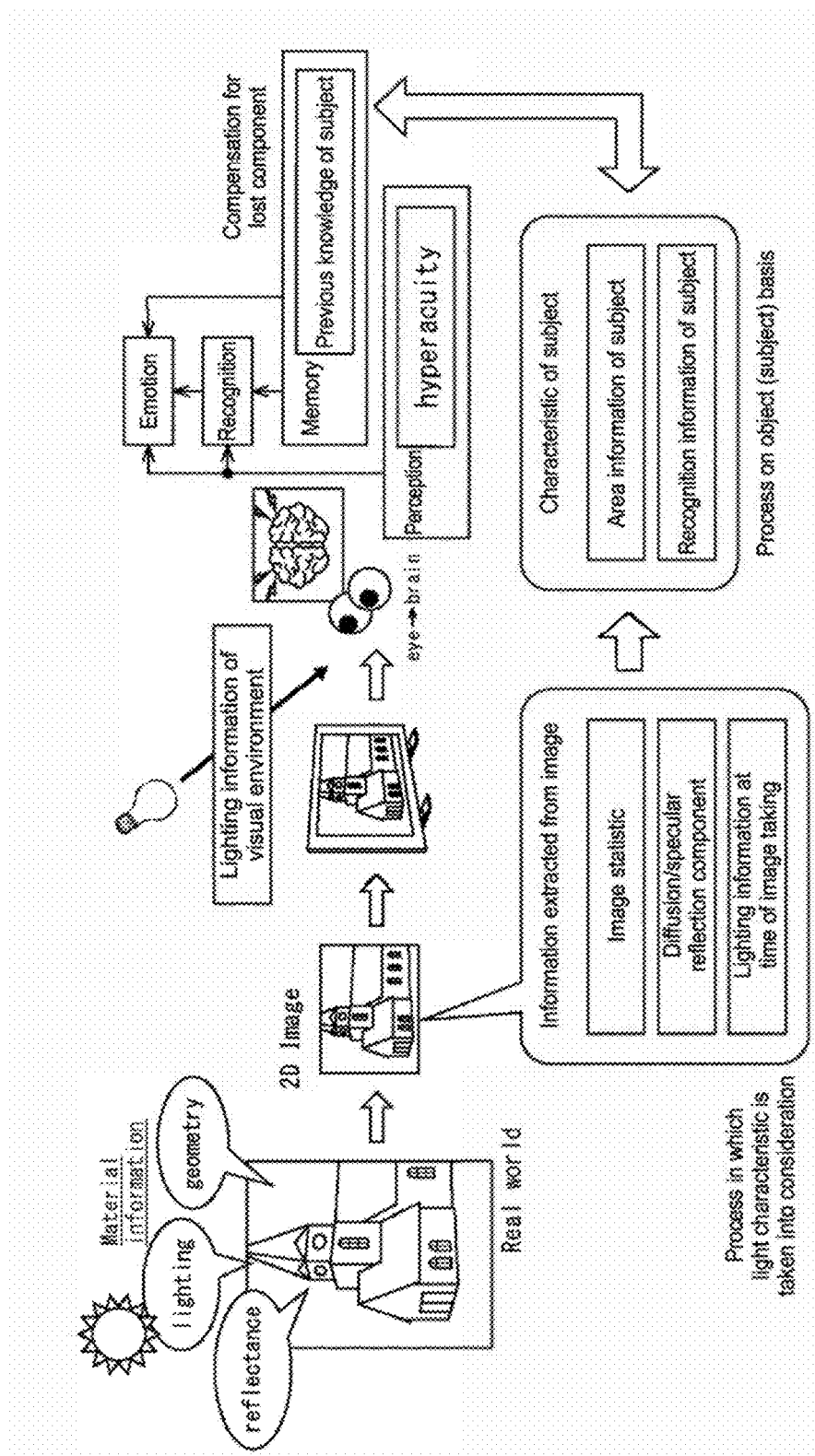
FIG. 1 A diagram for explaining a concept of the present technology.

With reference to FIG. 1, the concept of the present technology will be described. The present technology improves a material feel of an object in an image.

In a real world, what persons feel with eyes, that is, physical information (Material imformation) indicating how persons get light visually is fundamentally necessary information. Examples of the physical information include sun light (lighting), a shape (geometry) of an object, a reflection component (reflectance) of an object, and the like. With those pieces of physical information, logically, light can be reproduced.

The physical information enters a center of a camera. Therefore, on a basis of information (image statistic, diffusion/specular reflection component, and lighting information at time of shooting) extracted from an image (2D Image), this is estimated as characteristic information of a subject (area information or recognition information of a subject), and the information can be obtained.

It should be noted that a process of extracting information from an image is a process that takes characteristics of light into consideration, and a process of estimating the characteristic as the characteristic information of a subject is an object (subject) based process.

Thus, in the present technology, information extracted from an image is used as characteristic information of a subject, and a material feel of (a surface) of a subject in an image is controlled. Further, at a time of the control, it is also possible to use physical information which is obtained by measuring from the real world.

Further, a material feel of a subject in an image relates to not only the physical information but also, in actuality, information of an environment in which a person performs viewing (lighting information of visual environment) and information relating to how a person feels (perception: hyperacuity). Thus, in the present technology, not only by using the physical information but also by using the information of a viewing environment (lighting information of visual environment) and the information relating to how a person feels, the material feel of the subject in an image is controlled, and an image is recreated.

As described above, in the present technology, the material feel of the subject in the image is controlled. In the description herein, the material feel refers to a psychological feeling (psychological factor) of a person which is generated with respect to a feature (physical factor) of a material.

That is, in the description, it is defined that the material feel has a parameter indicating a physical characteristic of a subject as a physical factor and a parameter indicating a perception sensitivity of a subject as a psychological factor.

Thus, material feel control in the description means controlling the parameters of the physical factor and the psychological factor described above. It should be noted that, hereinafter, at a time of material feel control, it will be described that a physical characteristic parameter of the physical factor is controlled. However, actually, at that time, the parameter indicating the perception sensitivity of the subject as the parameter of the psychological factor is also controlled.

[Texture Control Method in Present Technology]

Subsequently, with reference to FIG. 2, a material feel control method of the present technology will be described.

First, an image of a subject in a real world is taken, and the image of the subject is input to a measurement and estimation block 1. In the measurement and estimation block 1, a physical characteristic parameter that indicates a physical characteristic of the subject is obtained by performing a measurement from the real world at the time of taking the image of the subject. Alternatively, in the measurement and estimation block 1, the physical characteristic parameter that indicates the physical characteristic of the subject is obtained by performing an estimation from the input image of the subject. For example, as the physical characteristic parameter, the lighting, the structure of the subject, and the reflection characteristic described above are obtained.

The obtained physical characteristic parameter of the subject is modeled in a real world modeling block 2. The physical characteristic parameter of the modeled subject is input to a material feel control block 3.

In the material feel control block 3, a material feel of the subject in the image is controlled depending on the physical characteristic parameter of the modeled subject or a feature amount (texture) obtained from the image. As an example of the material feel control, for example, the physical characteristic parameter is changed in order to make reflection easy. As a result, an optical characteristic of the subject is optimized. Further, for example, if there is a part lacking the texture, this is appropriately restored. That is, in the material feel control block 3, as the material feel control, in order to increase visual shininess or transparency, the physical characteristic parameters are changed (controlled).

In a rendering and retouch block 4, in accordance with a result obtained by controlling the material feel (changed parameters), to restructure the image, the image is re-synthesized (rendered), and an image as a result of making a fine adjustment for image quality is output.

Through the processes described above, according to the present technology, in a case where an input image is different from an actual appearance, for example, in the image, an optimization of illumination light, an improvement of the shininess, and a reproduction of the transparency are performed. That is, it is possible to reproduce, in a video, a situation at a time when the subject is actually viewed.

<First Embodiment>
[Configuration Example of Image Processing Apparatus]

Figure 3:
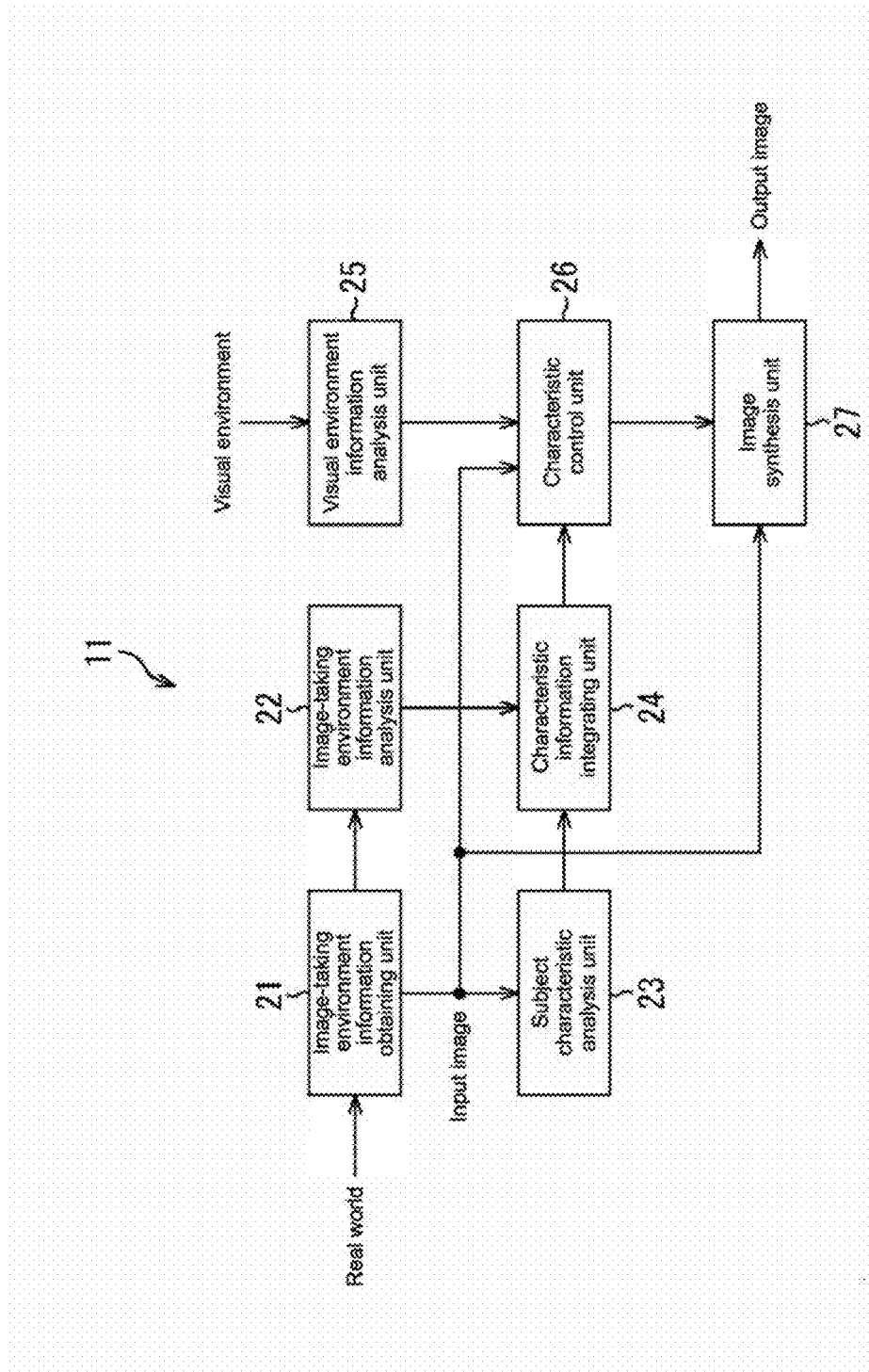
FIG. 3 A block diagram for showing a main configuration example of an image processing apparatus.

FIG. 3 is a block diagram showing a configuration of an embodiment of an image processing apparatus to which the present disclosure is applied.

As described above, an image processing apparatus 11 shown in FIG. 3 obtains a physical characteristic parameter relating to a subject in an image of the subject in the real world which is taken and input, controls a material feel of the subject in the image, and outputs an image in which the material feel of the subject is controlled.

The image processing apparatus 11 includes an image-taking environment information obtaining unit 21, an image-taking environment information analysis unit 22, a subject characteristic analysis unit 23, a characteristic information integrating unit 24, a visual environment information analysis unit 25, a characteristic control unit 26, and an image synthesis unit 27.

Figure 2:
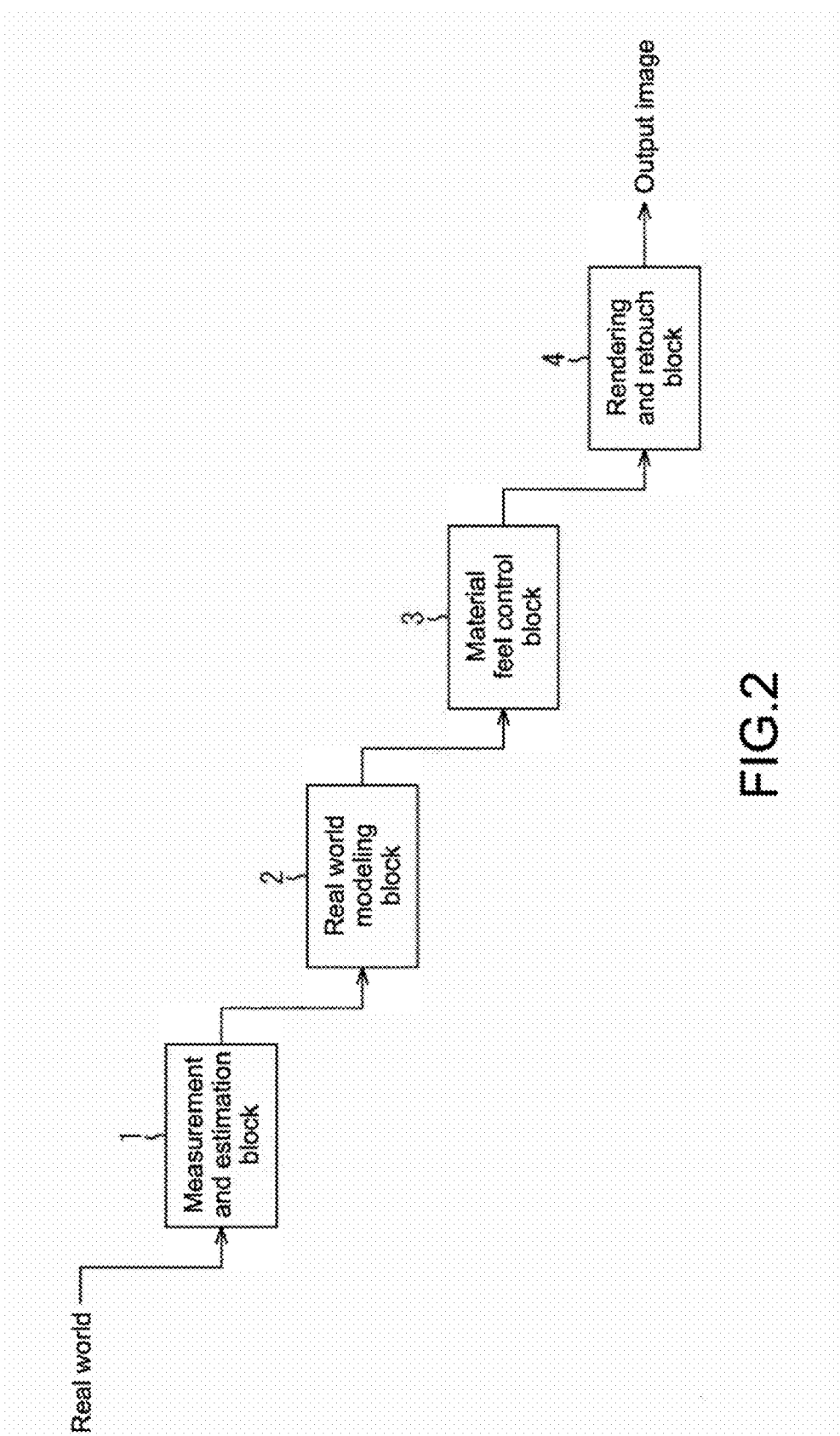
FIG. 2 A diagram for explaining a material feel control method of the present technology.

The image-taking environment information obtaining unit 21, the image-taking environment information analysis unit 22, and the subject characteristic analysis unit 23 correspond to the measurement and estimation block 1 shown in FIG. 2. The characteristic information integrating unit 24 corresponds to the real world modeling block 2 shown in FIG. 2. The characteristic control unit 26 corresponds to the material feel control block 3 shown in FIG. 2. The image synthesis unit 27 corresponds to the rendering and retouch block 4.

The image-taking environment information obtaining unit 21 takes an image of a subject, inputs the image of the subject, and supplies the input image to the subject characteristic analysis unit 23 and the image synthesis unit 27. Further, the image-taking environment information obtaining unit 21 obtains, at a time of taking the image of the subject, information at the time of image taking which relates to an environment and the subject, and supplies the obtained information at the time of image taking to the image-taking environment information analysis unit 22.

The image-taking environment information analysis unit 22 analyzes the information at the time of image taking obtained from the image-taking environment information obtaining unit 21 at the time of image taking, and supplies the analyzed information at the time of image taking to the characteristic information integrating unit 24.

From the input image from the image-taking environment information obtaining unit 21, the subject characteristic analysis unit 23 estimates and analyzes a characteristic of the subject, and supplies the analyzed image estimation information to the characteristic information integrating unit 24. In the subject characteristic analysis unit 23, information relating to a fine (for example, having a high sampling rate) part which cannot be obtained at the time of image taking as the information at the time of image taking can be obtained by performing estimation from the image.

Specifically, for example, the subject characteristic analysis unit 23 estimates and analyzes a reflection characteristic of the subject from the supplied input image as the characteristic of the subject, for example. However, in the reflection characteristic estimation, in a case where a dichromatic reflection model is used, a highlight area (low chroma and high luminance part) is difficult to be detected. That is, in the reflection characteristic estimation that uses color information, it is difficult to detect a highlight area with a low chroma.

Further, in a specular reflection component as a result of the reflection characteristic estimation, it is impossible to detect the highlight area part. For this reason, if a specular reflection enhancement is performed, dapples or a boundary is enhanced. Further, when the highlight area is detected by another process, a boundary with the specular reflection component or an excessive detection is caused.

If detection accuracy of the reflection characteristic estimation and the highlight area estimation is low, or an erroneous detection due to a noise or an influence of a movement occurs, the specular reflection enhancement is caused too much. Therefore, it is necessary to weaken the enhancement entirely, so exerting performance sufficiently is difficult.

Further, with respect to an overexposed white (saturated) area, it is difficult to produce a specular reflection enhancement effect.

In view of this, the subject characteristic analysis unit 23 performs highlight area detection by using the specular reflection component as the reflection characteristic estimation result in parallel with the reflection characteristic estimation. The subject characteristic analysis unit 23 supplies the specular reflection component, which is the reflection characteristic estimation result of the subject analyzed and the highlight area detection result to the characteristic information integrating unit 24 as image estimation information.

The characteristic information integrating unit 24 integrates the information at the time of image taking from the image-taking environment information analysis unit 22 and the image estimation information from the subject characteristic analysis unit 23, and supplies the integrated information to the characteristic control unit 26 as the physical characteristic parameter relating to the subject.

The visual environment information analysis unit 25 obtains and analyzes information of visual environment, which is an environment at a time when the image is viewed. The visual environment information analysis unit 25 supplies the analyzed visual environment information to the characteristic control unit 26 as a visual environment parameter.

It should be noted that the physical characteristic parameter relating to the subject includes depth and geometry information of the subject, lighting information at a time of image taking, material information of the subject, and reflection characteristic information of the subject. It should be noted that the lighting information at the time of image taking also affects color or the like of the subject and is information relating to the subject or relating to a background of the subject, and thus is included in the physical characteristic parameter relating to the subject.

The visual environment parameter includes visual environment light information, a viewing time period, and an attention subject (line of sight) information.

To control the material feel of the subject in the image (in this case, image quality), the characteristic control unit 26 uses, as a control parameter, the physical characteristic parameter relating to the subject from the characteristic information integrating unit 24 and the visual environment parameter from the visual environment information analysis unit 25. Specifically, for example, on a basis of the physical characteristic parameter from the characteristic information integrating unit 24, the characteristic control unit 26 determines a process content to control the material feel, such as changing the image quality, adjusting the reflection characteristic, or changing the geometry. It should be noted that, out of those, at a time of adjusting the reflection characteristic, the characteristic control unit 26 further determines a process content to perform a limit process based on an input and output difference and shadow control.

The characteristic control unit 26 supplies information relating to the determined process content to the image synthesis unit 27, and causes the image synthesis unit 27 to perform the material feel control. It should be noted that the material feel control may also be image quality control to produce a material feel, in a case where the control is performed by the image synthesis unit 27. For example, in a case where a sound synthesis unit (not shown) or the like is caused to perform the material feel control, it can be said that the material feel control is also sound quality control to produce the material feel. Further, in accordance with the visual environment parameter, the characteristic control unit 26 causes the image synthesis unit 27 to perform the material feel control, and optimizes the material feel control.

Under the control by the characteristic control unit 26, the image synthesis unit 27 re-synthesizes (rendering) and adjusts an input image from the image-taking environment information obtaining unit 21, and outputs a result of the re-synthesis as an output image.

[Configuration Examples of Subject Characteristic Analysis Unit and Characteristic Control Unit]

Figure 4:
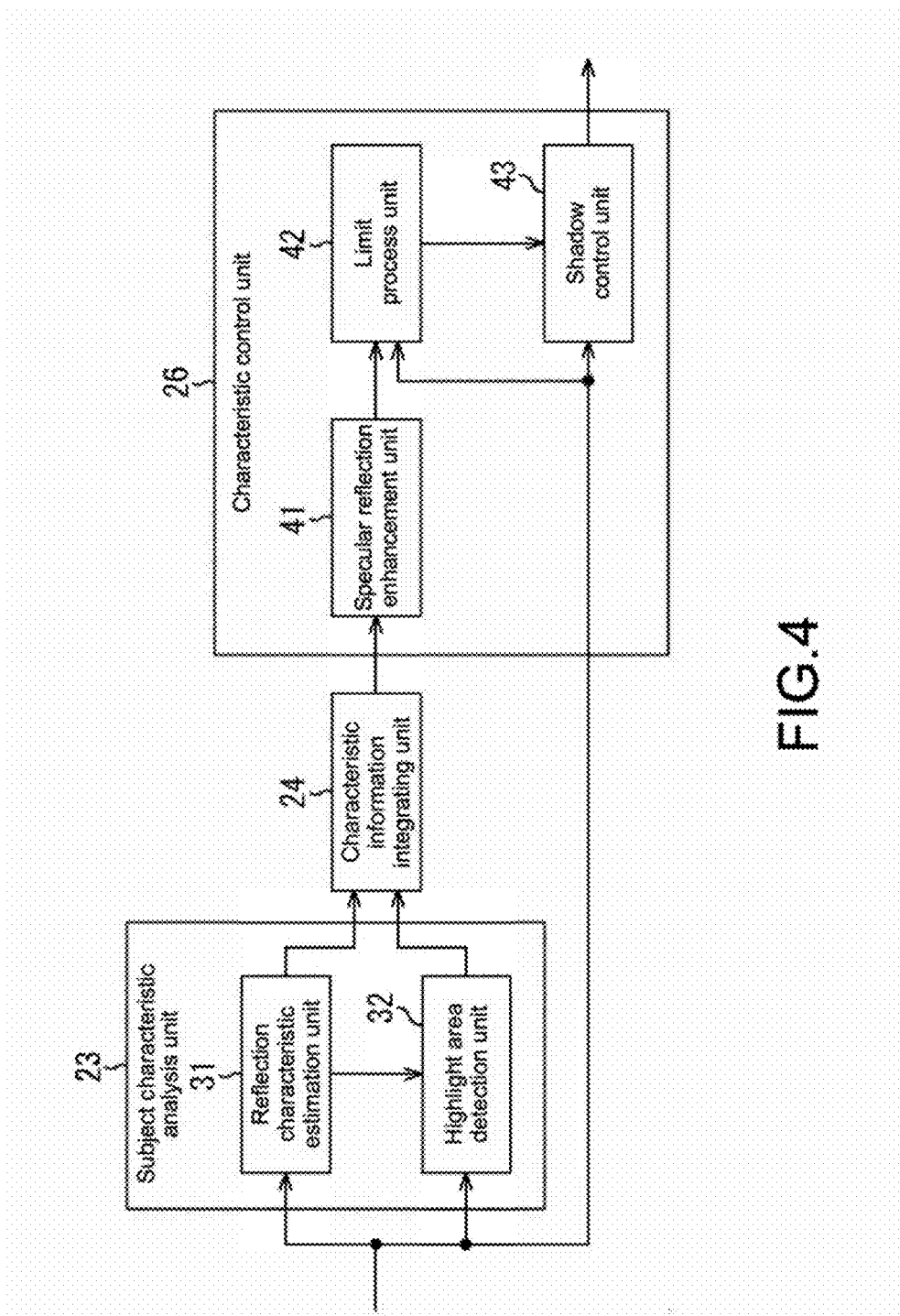
FIG. 4 A block diagram showing a configuration example of a subject characteristic analysis unit and a characteristic control unit.

FIG. 4 is a block diagram showing configuration examples of the subject characteristic analysis unit 23 and the characteristic control unit 26.

The subject characteristic analysis unit 23 includes a reflection characteristic estimation unit 31 and a highlight area detection unit 32.

The characteristic control unit 26 includes a specular reflection enhancement unit 41, a limit process unit 42, and a shadow control unit 43.

The input image from the image-taking environment information obtaining unit 21 is input not only to the reflection characteristic estimation unit 31 and the highlight area detection unit 32 but also to the limit process unit 42 and the shadow control unit 43.

From the supplied input image, the reflection characteristic estimation unit 31 estimates and analyzes, as the characteristic of the subject, for example, a reflection characteristic of the subject. The reflection characteristic estimation unit 31 supplies a specular reflection component (information indicating that the specular reflection component is strong), which is a reflection characteristic estimation result, to the characteristic information integrating unit 24 and the highlight area detection unit 32 as image estimation information.

In parallel with the process with the reflection characteristic estimation unit 31, the highlight area detection unit 32 uses a specular reflection component, which is the reflection characteristic estimation result from the reflection characteristic estimation unit 31 to perform highlight area detection, and supplies the highlight area detection result to the characteristic information integrating unit 24 as the image estimation information.

The characteristic information integrating unit 24 integrates, out of the image estimation information, the specular reflection component, which is the reflection characteristic of the subject estimation result from the reflection characteristic estimation unit 31 and the highlight area detection result from the highlight area detection unit 32. The characteristic information integrating unit 24 integrates the information at the time of image taking from the image-taking environment information analysis unit 22 and the image estimation information from the subject characteristic analysis unit 23, and supplies the information, as the physical characteristic parameter relating to the subject, to the specular reflection enhancement unit 41 of the characteristic control unit 26.

On a basis of the physical characteristic parameter from the characteristic information integrating unit 24, the specular reflection enhancement unit 41 adjusts the reflection characteristic. Specifically, on a basis of the physical characteristic parameter (specular reflection component and highlight area detection result) from the characteristic information integrating unit 24, the specular reflection enhancement unit 41 determines a process content to enhance the specular reflection component and the highlight area and supplies the determined process content to the limit process unit 42. As a result, the specular reflection enhancement unit 41 can cause the image synthesis unit 27 to enhance the specular reflection component and the highlight area in the image. That is, the specular reflection enhancement unit 41 enhances, as the process content, the specular reflection component and the highlight area in the input image.

With reference to the process content from the specular reflection enhancement unit 41, that is, with respect to the image in which the specular reflection component and the highlight area are enhanced, which is the process result by the specular reflection enhancement unit 41, the limit process unit 42 performs the limit process based on an input and output difference. The limit process based on an input and output difference will be described in detail with reference to FIG. 8. Actually, the limit process unit 42 determines the process content to perform the limit process based on a difference between the input image and the image in which the specular reflection component and the highlight area are enhanced, which is the process result by the specular reflection enhancement unit 41, and supplies the determined process content to the shadow control unit 43. As a result, the limit process unit 42 can cause the image synthesis unit 27 to perform the limit process based on an input and output difference. That is, the limit process unit 42 performs the limit process based on an input and output difference limit process with respect to the image in which the specular reflection component and the highlight area are enhanced, which is the process result by the specular reflection enhancement unit 41, as the process content.

The shadow control unit 43 uses the process content from the limit process unit 42, that is, performs the shadow control with respect to the image that is subjected to the limit process by the limit process unit 42. The shadow control will be described in detail with reference to FIG. 10. Actually, the shadow control unit 43 uses the difference between the input image and the image that is subjected to the limit process by the limit process unit 42, to determine the process content for performing the shadow control, and outputs the determined process content to the image synthesis unit 27. As a result, the shadow control unit 43 can cause the image synthesis unit 27 to perform the shadow control. That is, the shadow control unit 43 performs the shadow control with respect to the image that is subjected to the limit process by the limit process unit 42 as the process content.

It should be noted that, the shadow control unit 43 is an option for making a picture and may not necessarily be configured.

[About highlight area detection]

FIGS. 5A, 5B, 5C, and FIG. 6 are diagrams for specifically explaining the highlight area detection by the highlight area detection unit 32.

The highlight area detection unit 32 detects an area where the specular reflection component is not detected, a high luminance area, and a low chroma area, as a highlight area. The area where the specular reflection component is not detected, that is, an area with a low specular reflection component is detected by using the specular reflection component as the reflection characteristic estimation result from the reflection characteristic estimation unit 31.

FIG. 5A shows a gain curve for a low specular reflection component to enhance a gain of the low specular reflection component. In FIG. 5A, a horizontal axis indicates the specular (specular reflection component), and a vertical axis indicates the gain for the low specular reflection component. FIG. 5B shows a gain curve for a high luminance to enhance a gain of the high luminance. In FIG. 5B, the horizontal axis indicates an input luminance, and a vertical axis indicates the gain for the high luminance. FIG. 5C is a gain curve for a low chroma to enhance a gain of the low chroma. In FIG. 5C, a horizontal axis indicates Sat (input chroma), and a vertical axis indicates the gain for the low chroma.

The highlight area detection unit 32 synthesizes (multiplies) the gains by the gain curves, and calculates the synthesized gain as a highlight area gain.

However, with only the conditions of the low specular reflection component, the high luminance, and the low chroma, a large-area part such as a high-luminance background is enhanced.

Here, because the highlight area has a tendency to be a small area, the highlight area detection unit 32 performs an area count and eliminates a large area part in order to reduce the highlight area.

Figure 6:
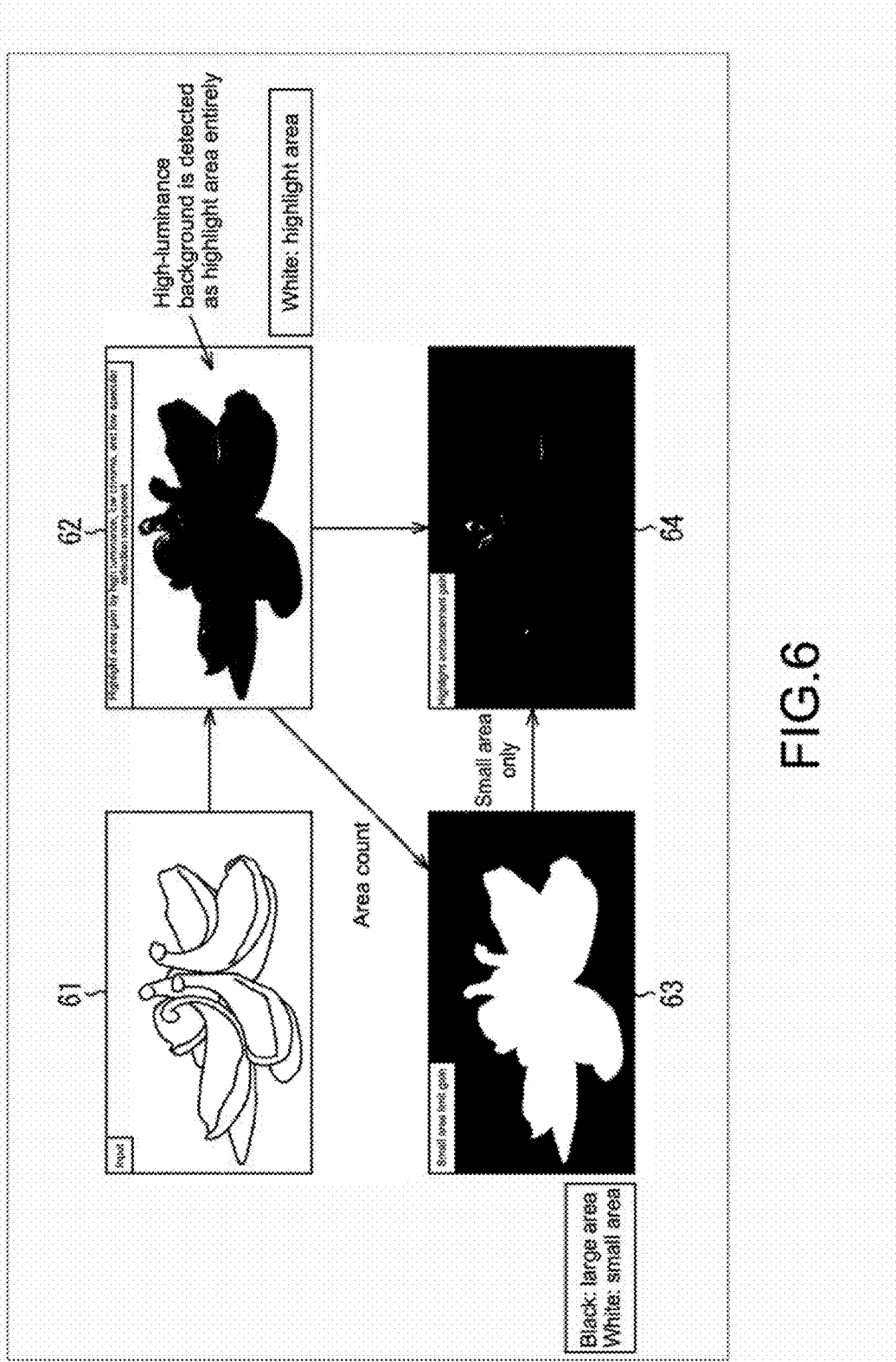
FIG. 6 A diagram for specifically explaining highlight area detection.

That is, as shown in FIG. 6, with respect to an input image 61, a highlight area gain 62 based on the high luminance, the low chroma, and the low specular reflection component is detected. Here, white is the highlight area, so the highlight area gain 62 is detected with the white background (high luminance background) as a highlight area entirely. In view of this, the highlight area detection unit 32 performs the area count with black as a large area and with white as a small area, and detects a small area limit gain 63. As a result, a highlight enhancement gain 64 which is limited in the small area is detected.

Figure 7:
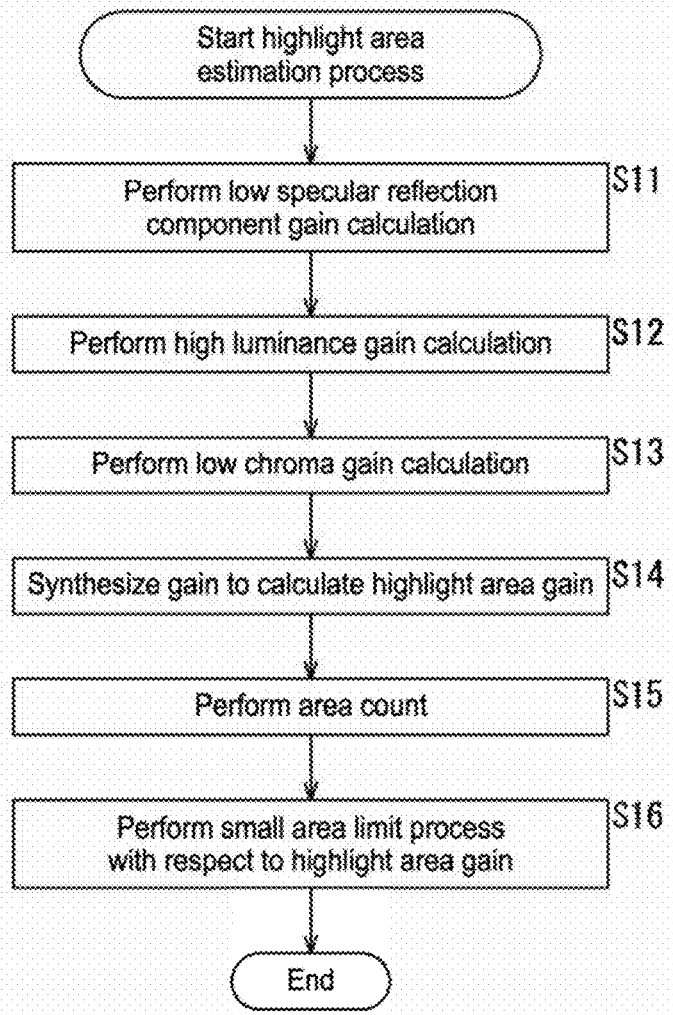
FIG. 7 A flowchart for explaining highlight an area estimation process.

Subsequently, with reference to a flowchart shown in FIG. 7, a highlight area estimation process by the highlight area detection unit 32 will be described.

In Step S11, the highlight area detection unit 32 performs a low specular reflection component gain calculation with respect to the input image by using the specular reflection component, which is the reflection characteristic estimation result from the reflection characteristic estimation unit 31.

In Step S12, the highlight area detection unit 32 performs a high luminance gain calculation with respect to the input image. In Step S13, the highlight area detection unit 32 performs a low chroma gain calculation with respect to the input image. In Step S14, the gains obtained in Steps S11 to S13 are synthesized, and the highlight area gain is calculated.

In Step S15, the highlight area detection unit 32 performs the area count in the highlight area gain. In Step S16, the highlight area detection unit 32 performs a small area limited process with respect to the highlight area gain, and detects the highlight enhancement gain 64. As a result, the highlight area estimation process is terminated.

The highlight area is detected as described above, so it is possible to detect and enhance the low chroma, the high luminance, and the small area part which cannot be detected and enhanced by the reflection characteristic estimation. Further, by using the specular reflection component, the highlight area detection is performed, so a boundary or excessive detection is unlikely to occur.

[About Limit Process Based on Input and Output Difference]

Figure 8:
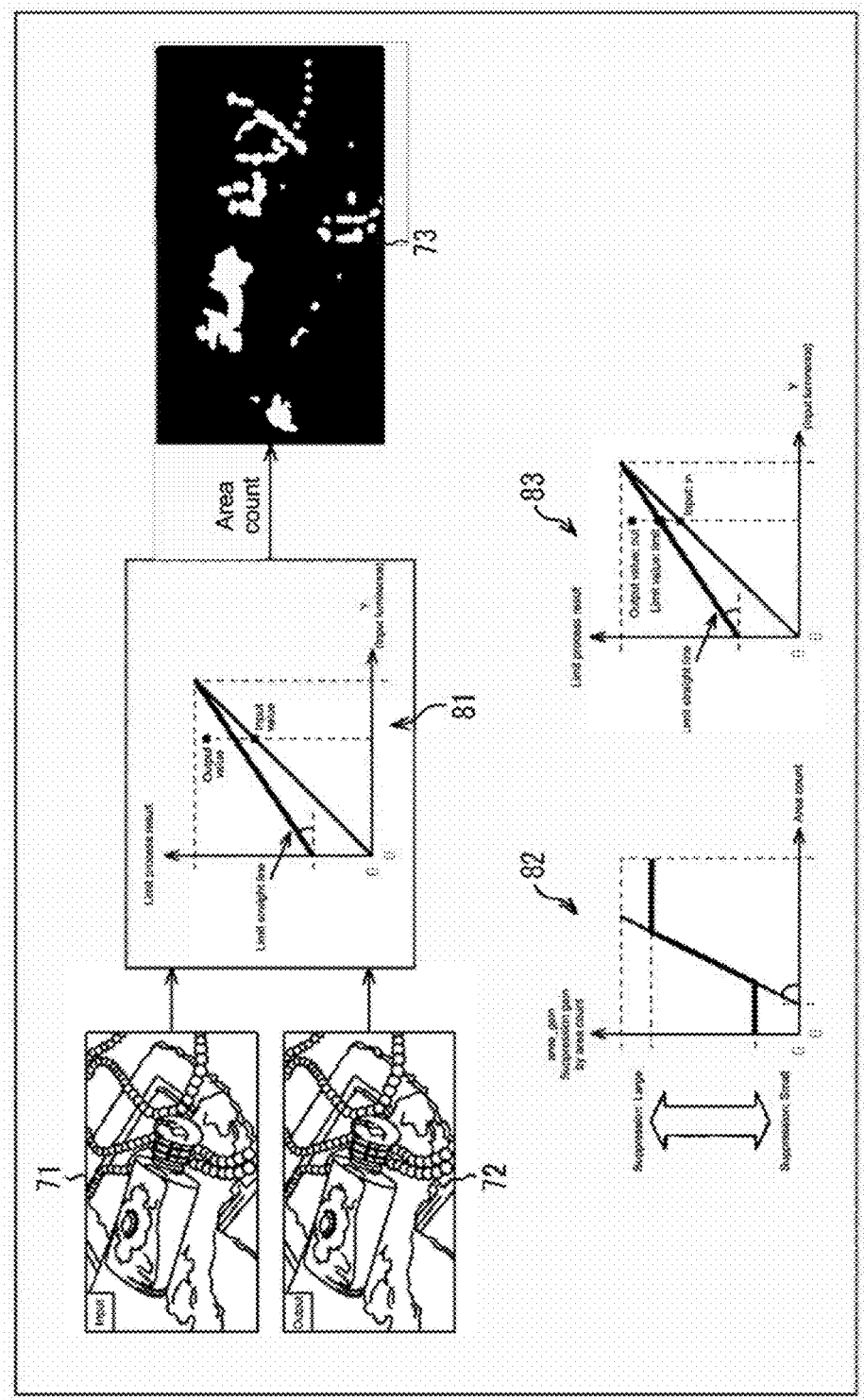
FIG. 8 A diagram for specifically explaining a limit process based on an input and output difference.

FIG. 8 is a diagram for specifically explaining a limit process based on an input and output difference by the limit process unit 42.

The limit process unit 42 performs an area count for parts where projection is caused too much on a basis of a difference between an input image 71 and an output image 72 from the specular reflection enhancement unit 41. That is, as shown in a graph 81, the limit process unit 42 counts an area of pixels where the difference between the input image 71 and the output image 72 exceeds area count limit straight line, and detects an area count 73. In the graph 81, a horizontal axis indicates an input luminance, and a vertical axis represents a limit process result. The area count 73 counts and detects the area of the pixels where an output value corresponding to an input value exceeds the area count limit straight line. The area count limit straight line is specified as a parameter and created.

Subsequently, the limit process unit 42 performs a limit process with the area count 73 as a suppression gain. That is, the limit process unit 42 performs, as the limit process, a process of limiting (suppressing) a degree of enhancement of the specular reflection and the highlight area by the specular reflection enhancement unit 41 depending on the area.

In a graph 82, a horizontal axis indicates an area count, and a vertical axis indicates a suppression gain based on the area count. As shown in graph 82, in a case where the area count is large, the limit process (suppression gain) is enhanced, and in a case where the area count is small, the limit process is weakened.

As a result, projection of a small area is tolerated, and thus it is possible to perform image making in which an excessive enhancement of a large area is suppressed.

In a graph 83, a horizontal axis indicates an input luminance, and a vertical axis indicates a limit process result. An input value is represented by in, an output value is represented by out, a limit value is represented by limit, and a suppression gain based on the area count shown in the graph 83 is represented by area_gain. A suppression process based on an area count result is expressed by the following expression (1).

$$\text{area\_out} = \text{limit} + (\text{out} - \text{limit}) \ast (1.0 - \text{area\_gain}) \quad (1)$$

That is, in a case where the area count is large, when an assumption is made that area_gain is 1, area_out=limit is established. Thus, an area having a large area is significantly suppressed. On the other hand, in a case where the area count is small, when an assumption is made that area_gain is 0, area_out=out is established. Thus, an area having a small area is not suppressed to have a value as it is.

It should be noted that the limit straight line for the limit process is calculated in accordance with an input, and depending on an input value, the limit value is varied. Therefore, gradation collapse or gradation inversion is unlikely to occur. Further, the area count limit straight line may be used for the limit process.

Figure 9:
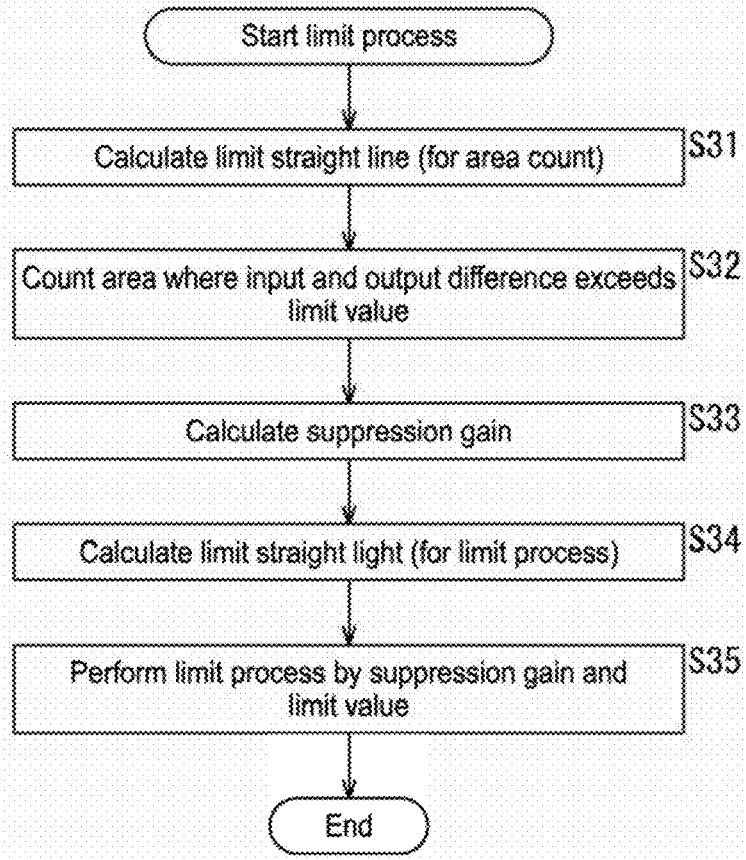
FIG. 9 flowchart for explaining the limit process.

Subsequently, with reference to a flowchart of FIG. 9, a limit process by the limit process unit 42 will be described.

In Step S31, the limit process unit 42 uses a difference between the input image 71 and the output image 72 of the specular reflection enhancement unit 41 to calculate the area count limit straight line shown in the graph 81. In Step S32, the limit process unit 42 counts an area where an input and output difference exceeds the limit value.

In Step S33, the limit process unit 42 calculates the suppression gain shown in the graph 82. In Step S34, the limit process unit 42 calculates the limit straight line for the limit process shown in the graph 83.

In Step S35, the limit process unit 42 performs the limit process with the suppression gain and the limit value. After that, the limit process is terminated.

As described above, through the limit process based on an input and output difference, a degree of enhancement of the specular reflection and the highlight area is limited. As a result, it is possible to make a boundary between the specular reflection component and the highlight area component less prominent, and suppress dapples, excessive enhancement, or gradation collapse.

Further, the area count is performed for the part where the difference between the input image and the enhancement result (output image) is large, and only the large area part is subjected to the limit process. As a result, it is possible to perform image making in which projection of the small area is tolerated, and only excessive enhancement for the large area is suppressed. Further, it is possible to change a limit value depending on a value of the input image, so gradation collapse or gradation inversion is unlikely to occur. Further, by performing the area count, the limit process is changed locally, so it is unnecessary to entirely weaken the enhancement to make an appropriate enhancement possible.

[About Shadow Control]

Figure 10:
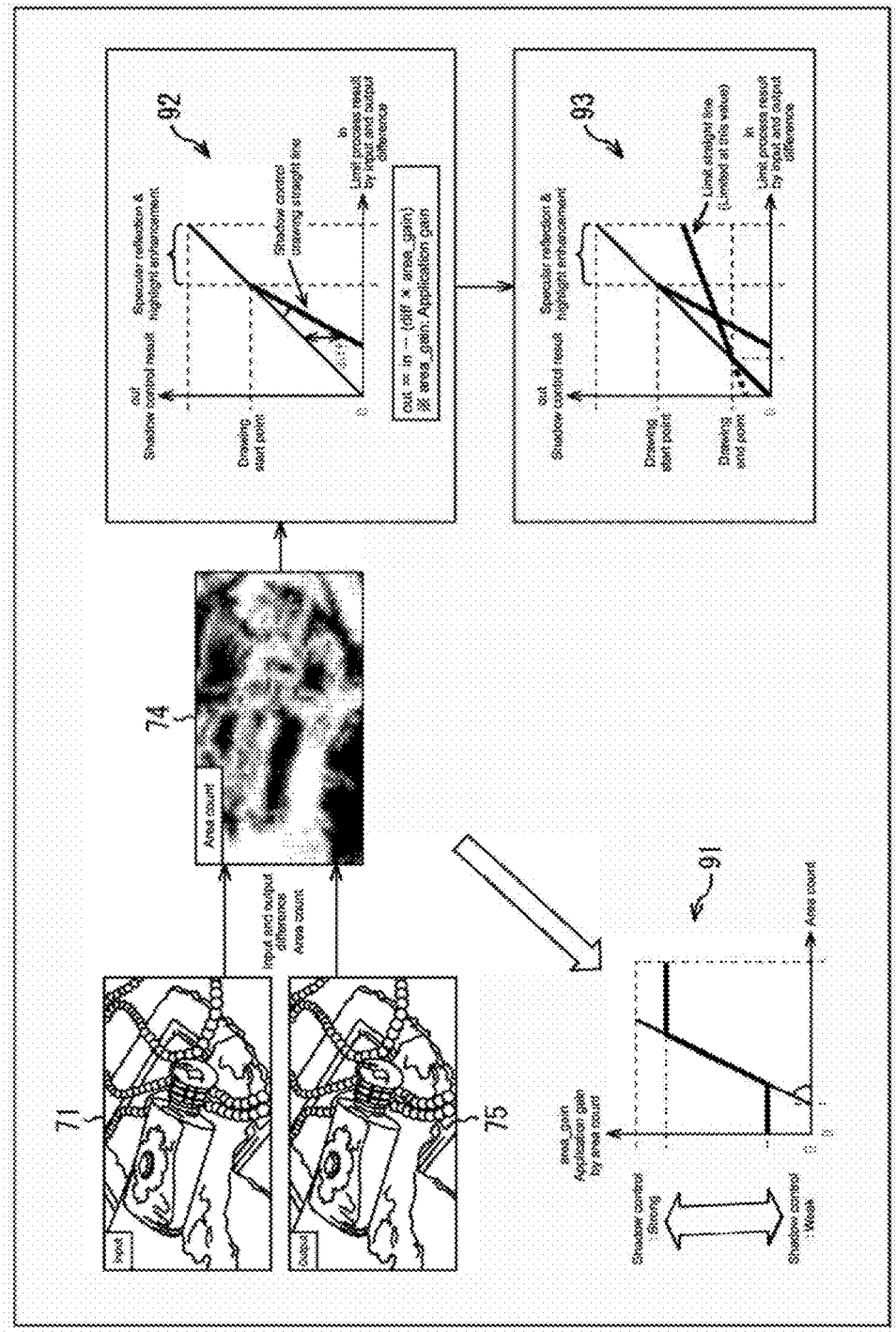
FIG. 10 A diagram for specifically explaining shadow control.

FIG. 10 is a diagram for specifically explaining a shadow control by the shadow control unit 43. The shadow control unit 43 performs shadow control, which is a process of drawing (lowering) a luminance around the specular reflection enhancement, thereby improving contrast locally.

Specifically, the shadow control unit 43 performs area count for a part where a difference (input and output difference) between the input image 71 and an output image 75 as a limit process result of the limit process unit 42, and calculates an area count 74 as a count result. Further, in a graph 91, a horizontal axis indicates an area count, and a vertical axis indicates an application gain (area_gain) based on the area count.

In the area count 74, a white part corresponds to a part where the input and output difference is large, that is, a part where the specular reflection enhancement is strong. Thus, as shown in the graph 91, by setting the application gain of this part to be strong, an area around the specular reflection enhancement can be subjected to the shadow control. On the other hand, in the area count 74, a black part is a part where the input and output difference is small, the specular reflection enhancement is weak, and as shown in the graph 91, the shadow control is performed to a small extent (difficult to be performed).

In a graph 92, a horizontal axis indicates a limit process result (in) based on an input and output difference, and a vertical axis indicates a shadow control result (out).

The shadow control unit 43 performs the specular reflection and highlight enhancement for an upper area from a draw start point set by a difference diff of a drawing straight line for the shadow control and an input. On the other hand, a lower area from the draw start point is drawn by the difference diff. This process can be expressed by an expression (2).

$$\text{out} = \text{in} - (\text{diff} \ast \text{area\_gain}) \quad (2)$$

where area_gain represents the application gain shown in the graph 91.

That is, at a time of area_gain=1.0, the shadow control is intensely performed, and at a time of area_gain=0.0, the shadow control is not performed substantially. As a result, it is possible to raise the luminance that should be raised and lower the luminance that should be lowered.

Further, as shown in a graph 93, at the same time as a drawing process, a limit process for the shadow control can be performed. In the graph 93, a horizontal axis indicates a limit process result (in) based on an input and output difference described above with reference to FIG. 8, and a vertical axis indicates a shadow control result (out).

That is, the shadow control unit 43 performs the specular reflection and highlight area enhancement for a luminance higher than a drawing start point and set a lower luminance as a target of a shadow area. On the other hand, drawing to the low luminance results in blacking, so as a countermeasure against excessive drawing of black, as shown in the graph 93, a limit straight line for the shadow control is calculated, and by a limit process with the calculated limit straight line for the shadow control, a shadow control target is set to an intermediate gradation. As a result, it is possible to suppress blacking due to drawing to the low luminance.

Figure 11:
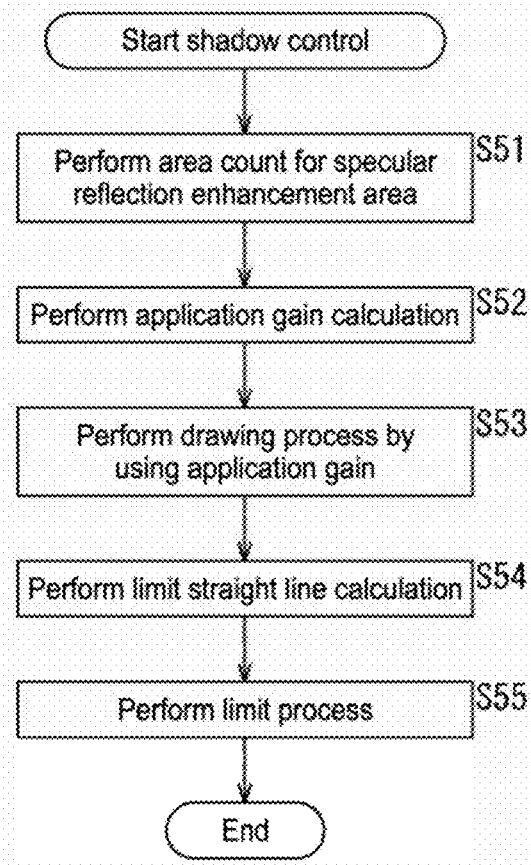
FIG. 11 A flowchart for explaining the shadow control.

Subsequently, with reference to a flowchart of FIG. 11, shadow control by a shadow processing unit 43 will be described.

In Step S51, the shadow processing unit 43 counts a part having a large input and output difference, that is, a specular reflection enhancement area. In Step S52, the shadow processing unit 43 calculates an application gain as shown in the graph 91.

In Step S53, the shadow processing unit 43 uses the application gain calculated in Step S52 to perform the drawing process as shown in the graph 92.

In Step S54, the shadow processing unit 43 calculates the limit straight line for the shadow control shown in the graph 93. In Step S55, the shadow processing unit 43 uses the limit straight line for the shadow control calculated in the Step S54 to perform the limit process. After that, the shadow control is terminated.

As described above, the shadow control, which is the process of drawing the luminance around the specular reflection enhancement is performed, so as compared with a process of only the specular reflection enhancement, a dynamic range in an object is increased. Therefore, the shininess and transparency are improved. the process is performed with respect to a periphery of an area where white is saturated, so the shininess and transparency are improved even in an area where the specular reflection enhancement effect is not exerted.

As described above, in the present technology, the highlight area detection that uses the specular reflection component is performed, and after an integration process with the specular reflection component, the specular reflection and the highlight enhancement are performed. Thus, it is possible to enhance a low chroma/high luminance part. That is, it is possible to reproduce a highlight area. Further, in the highlight area detection, the specular reflection component is used, so a boundary is unlikely to be caused.

Further, in the present technology, in addition to the highlight area detection, the limit process based on the difference between the input image and the enhancement result is performed, so it is possible to prevent dapples and gradation collapse.

That is, in the limit process based on the difference between the input data and the enhancement result, it is possible to perform the area count with the part having a large difference, and perform the limit process for only the large area part. Thus, it is possible to perform such image making that projection of a small area is tolerated, and excessive enhancement of the large area is suppressed. Further, the limit value is changed depending on values of the input data, so gradation collapse or gradation inversion is unlikely to be caused.

Further, the shadow control of drawing the luminance around the specular reflection enhancement is performed, so the contrast is improved locally. Because of the shadow control, the process is also performed for an area around the area where white is saturated, and thus a dynamic range in an object is increased. As a result, it is possible to improve the shininess and transparency.

[Example of Effect]

Figure 12:
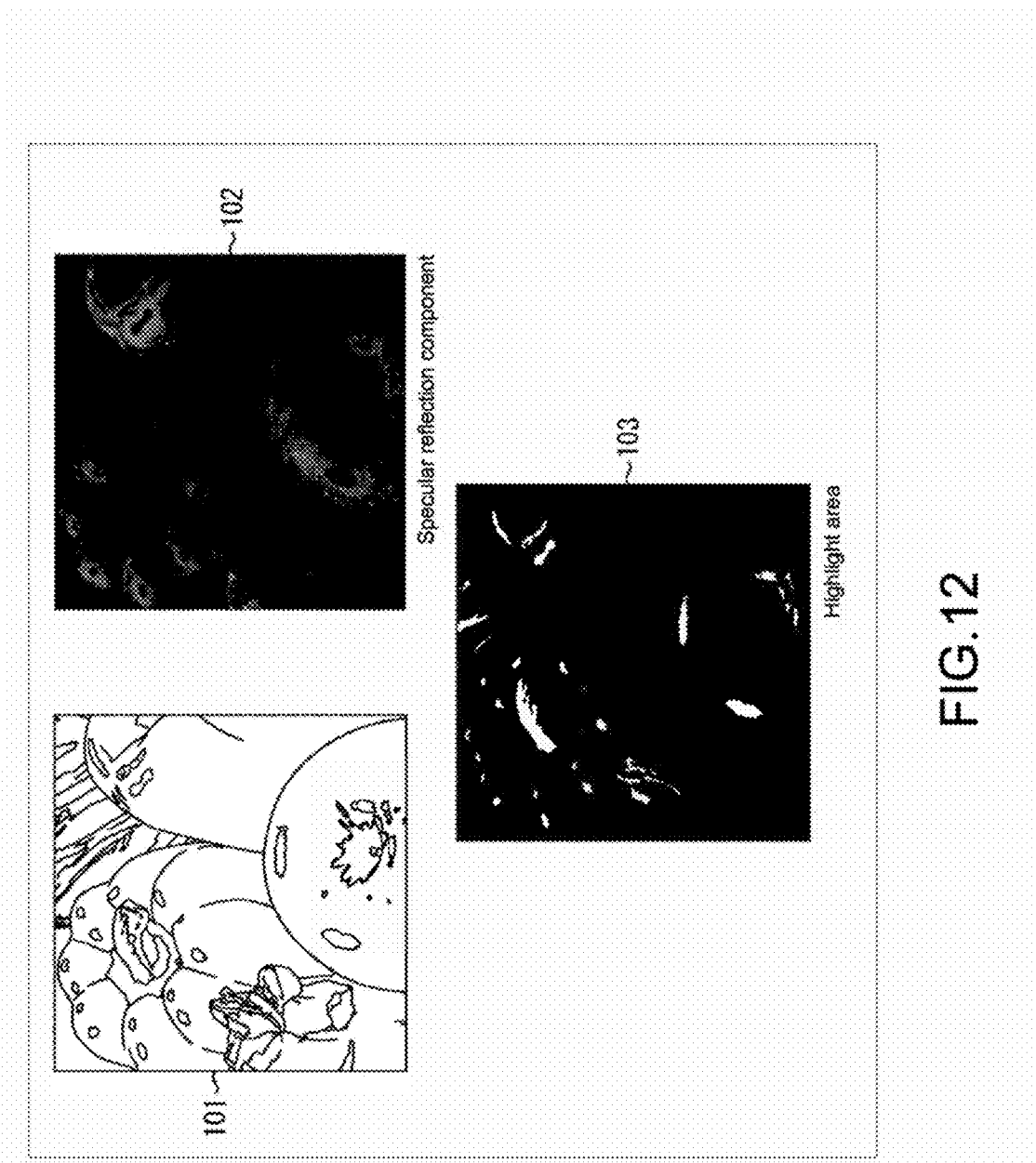
FIG. 12 A diagram showing an example of effects by the present technology.

FIG. 12 is a diagram showing an example of effects by the present technology. In a specular reflection component 102, which is a reflection characteristic estimation result obtained by the reflection characteristic estimation unit 31 with respect to an input image 101 showing a shine on a surface of an apple, a highlight area on the surface of the apple cannot be detected.

In contrast, in a highlight area detection result 103 of the present technology, a highlight area which cannot be detected in the specular reflection component is detected. As a result, it is possible to reproduce a material feel with higher reality.

[Example of Image Processing]

Figure 13:
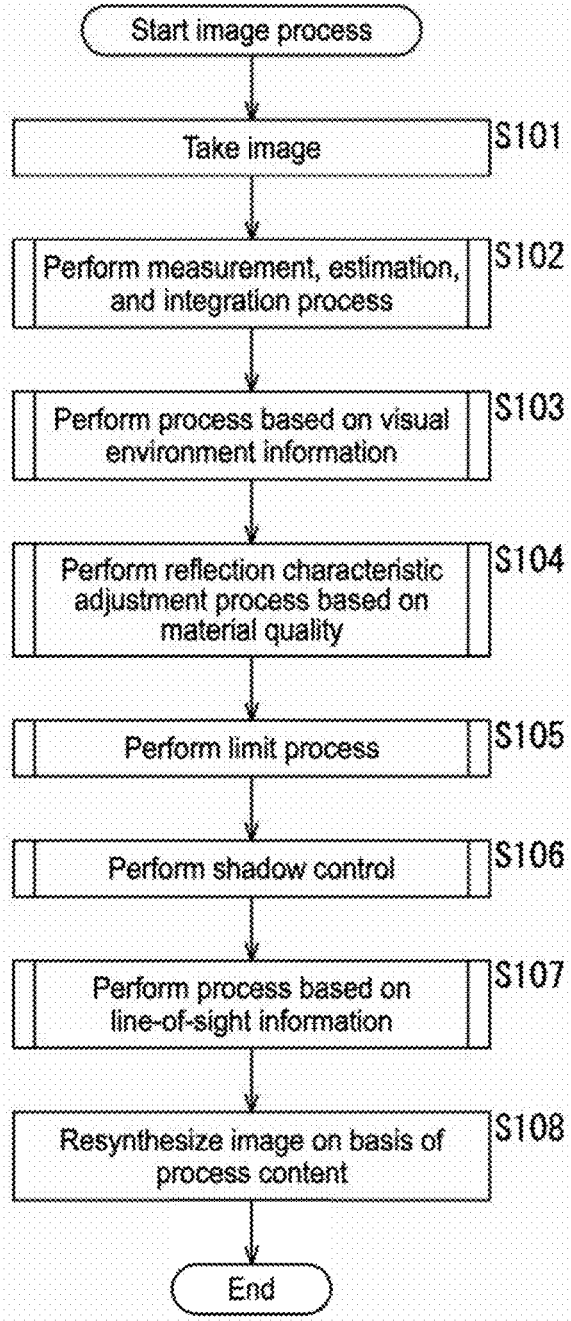
FIG. 13 A flowchart for explaining an image process of the image processing apparatus shown in FIG. 3.

Subsequently, with reference to a flowchart shown in FIG. 13, image processing of the image processing apparatus 11 shown in FIG. 3 will be described.

In Step S101, the image-taking environment information obtaining unit 21 takes an image of a subject and inputs the image of the subject. The image-taking environment information obtaining unit 21 supplies the input image to the subject characteristic analysis unit 23, the characteristic control unit 26, and the image synthesis unit 27.

In Step S102, the image-taking environment information obtaining unit 21, the image-taking environment information analysis unit 22, and the subject characteristic analysis unit 23 perform a measurement, estimation, and integration process. The measurement, estimation, and integration process will be described with reference to FIG. 14. By the process of Step S102, the measured physical characteristic parameter and the estimated physical characteristic parameter (reflection characteristic of the subject, highlight area detection result, image-taking environmental light, subject geometry, material quality of the subject, or the like) to the characteristic control unit 26.

In Step S103, the visual environment information analysis unit 25 and the characteristic control unit 26 performs a process based on visual environment information, which is an environment at a time of viewing an image. The process based on the visual environment information will be described later with reference to FIG. 15. By the process of Step S103, a process content of material feel control based on the visual environment information is determined.

In Step S104, (the specular reflection enhancement unit 41 of) the characteristic control unit 26 performs a reflection characteristic adjustment process based on the material quality of the subject. The reflection characteristic adjustment process will be described with reference to FIG. 16. It should be noted that, at this time, the physical characteristic parameter (material quality and reflection characteristic, highlight area detection result) integrated by the characteristic information integrating unit 24 is referred to. By the process of Step S104, the process content of the material feel control based on the reflection characteristic is determined, the specular reflection and the highlight are enhanced by the specular reflection enhancement unit 41, and an enhancement result thereof is supplied to the limit process unit 42. It should be noted that the reflection characteristic adjustment process image may also be performed by synthesis unit 27 collectively in Step S108, but may actually be performed for the limit process and shadow control in a later stage as described in this explanation. In the case of being performed collectively by the image synthesis unit 27, the process content is supplied to the limit process unit 42.

In Step S105, the limit process unit 42 performs a limit process based on an input and output difference with reference to the specular reflection and the highlight enhancement result (process content in the case of performing the process collectively) from the specular reflection enhancement unit 41. In the limit process, a basically similar process to the limit process described above with reference to FIG. 9 is performed. An explanation thereof may be overlapped and thus will be omitted. By the process of Step S105, the process content for the limit process is determined, and the limit process is performed. A limit process result is supplied to the shadow control unit 43. It should be noted that the limit process may also be performed by the image synthesis unit 27 collectively in Step S108, but may actually be performed for the shadow control in a later stage as described in this explanation. In the case of being performed by the image synthesis unit 27, the process content is supplied to the shadow control unit 43.

In Step S106, the shadow control unit 43 uses a process result (process content in the case of performing the process collectively) from the limit process unit 42 to perform the shadow control. In the limit process, a basically similar process to the shadow control described above with reference to FIG. 11 is performed. An explanation thereof may be overlapped and thus will be omitted. By the process in Step S106, the process content for the shadow control is determined, and the shadow control process is performed. A shadow control result is supplied to the image synthesis unit 27. It should be noted that the shadow process may also be performed by the image synthesis unit 27 collectively in Step S108, but may actually be performed as described in this explanation. In the case of being performed by the image synthesis unit 27, the process content is supplied to the image synthesis unit 27.

In Step S107, the visual environment information analysis unit 25 and the characteristic control unit 26 performs a process based on line-of-sight information. The process based on the line-of-sight information will be described later with reference to FIG. 17. With the process of Step S107, a process content of the material feel control based on the line-of-sight information is determined.

In Step S108, on a basis of the determined process content of the material feel control, the image synthesis unit 27 re-synthesizes the input image. That is, in the case of FIG. 13, by a contrast adjustment of the visual environment light, an adjustment of the reflection characteristic (including the highlight area detection result) based on the material quality of the image, an adjustment based on the line-of-sight information, the limit process, and the shadow control, the material feel of the image of the subject is controlled.

Figure 14:
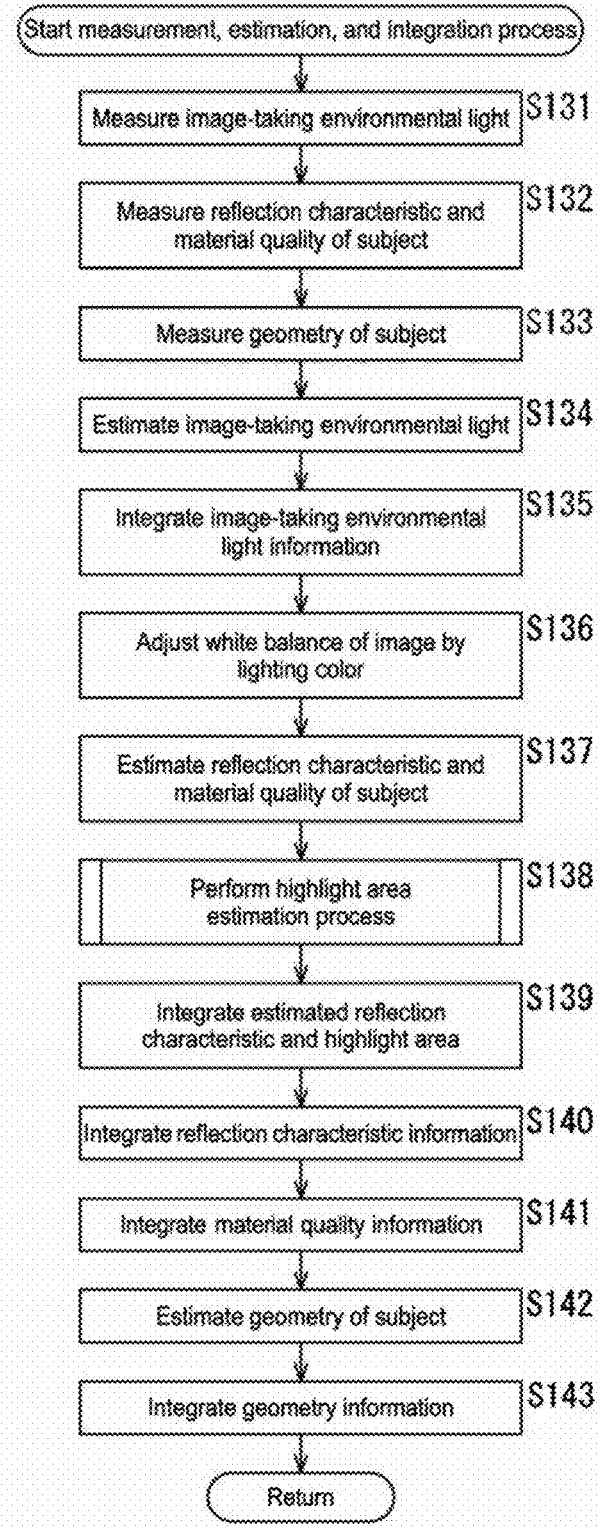
FIG. 14 A flowchart for explaining a measurement, estimation, and integration process.

Subsequently, with reference to a flowchart shown in FIG. 14, description will be given on the measurement, estimation, and integration process of Step S102 in FIG. 13.

In Step S131, the image-taking environment information obtaining unit 21 measures the image-taking environmental light, and supplies the measured image-taking environmental light to the image-taking environment information analysis unit 22. The image-taking environment information analysis unit 22 analyzes the image-taking environmental light from the image-taking environment information obtaining unit 21, and as a result of the analysis, supplies information relating to the image-taking environmental light to the characteristic information integrating unit 24.

In Step S132, the image-taking environment information obtaining unit 21 measures the reflection characteristic of the subject, and supplies the measured reflection characteristic of the subject and the material quality to the image-taking environment information analysis unit 22. The image-taking environment information analysis unit 22 analyzes the reflection characteristic of the subject and the material quality from the image-taking environment information obtaining unit 21, and supplies the analyzed reflection characteristic of the subject and the material quality to the characteristic information integrating unit 24.

In Step S133, the image-taking environment information obtaining unit 21 measures a geometry of the subject, and supplies the measured subject geometry to the image-taking environment information analysis unit 22. The image-taking environment information analysis unit 22 analyzes the subject geometry from the image-taking environment information obtaining unit 21, and supplies the analyzed subject geometry to the characteristic information integrating unit 24.

In Step S134, the subject characteristic analysis unit 23 estimates and analyzes the image-taking environmental light from the supplied input image, and as a result of the analysis, obtains information relating to the image-taking environmental light. The subject characteristic analysis unit 23 supplies the information relating to the image-taking environmental light to the characteristic information integrating unit 24.

In Step S135, the characteristic information integrating unit 24 integrates information relating to the measured image-taking environmental light and information relating to the estimated image-taking environmental light. The characteristic information integrating unit 24 supplies information relating to the integrated image-taking environmental light to the characteristic control unit 26 as the physical characteristic parameter.

In Step S136, the characteristic control unit 26 causes the image synthesis unit 27 to adjust white balance of an image with illumination color obtained from the information relating to the image-taking environmental light. It should be noted that this adjustment process may be made at a timing of the reflection characteristic adjustment process or the like in Step S104 of FIG. 13 described above, but it is desirable that another adjustment be made after the white balance adjustment. Thus, this process order is provided.

In Step S137, the subject characteristic analysis unit 23 estimates and analyzes the reflection characteristic of the subject and the material quality, and supplies information relating to the analyzed reflection characteristic and material quality to the characteristic information integrating unit 24. Out of this, from the supplied input image, the reflection characteristic estimation unit 31 estimates and analyzes, as the characteristic of the subject, the reflection characteristic of the subject, for example. The reflection characteristic estimation unit 31 supplies the specular reflection component as the reflection characteristic estimation result to the characteristic information integrating unit 24 as the image estimation information and also to the highlight area detection unit 32.

In Step S138, in parallel with the process with the reflection characteristic estimation unit 31, the highlight area detection unit 32 uses the specular reflection component, which is the reflection characteristic estimation result from the reflection characteristic estimation unit 31, thereby performing the highlight area detection. It should be noted that this process is basically similar to the process described with reference to FIG. 7, and an explanation thereof may be overlapped and thus will be omitted. With the process of Step S138, the highlight area detection result is supplied to the characteristic information integrating unit 24 as the image estimation information.

In Step S139, the characteristic information integrating unit 24 integrates the specular reflection component as the reflection characteristic of the subject estimation result from the reflection characteristic estimation unit 31 and the highlight area detection result from the highlight area detection unit 32.

In Step S140, the characteristic information integrating unit 24 integrates information relating to the measured reflection characteristic of the subject and information relating to the estimated reflection characteristic of the subject. The characteristic information integrating unit 24 supplies the integrated information relating to the reflection characteristic of the subject to the characteristic control unit 26 as the physical characteristic parameter.

In Step S141, the characteristic information integrating unit 24 integrates information relating to the measured material quality of the subject and information relating to the estimated material quality of the subject. The characteristic information integrating unit 24 supplies the integrated information relating to the material quality of the subject to the characteristic control unit 26 as the physical characteristic parameter.

In Step S142, the subject characteristic analysis unit 23 estimates and analyzes the geometry of the subject, and supplies information relating to the analyzed geometry of the subject to the characteristic information integrating unit 24.

In Step S143, the characteristic information integrating unit 24 integrates the measured information relating to the geometry of the subject and the estimated information relating to the geometry of the subject. The characteristic information integrating unit 24 supplies the integrated information of the geometry of the subject to the characteristic control unit 26 as the physical characteristic parameter.

Figure 15:
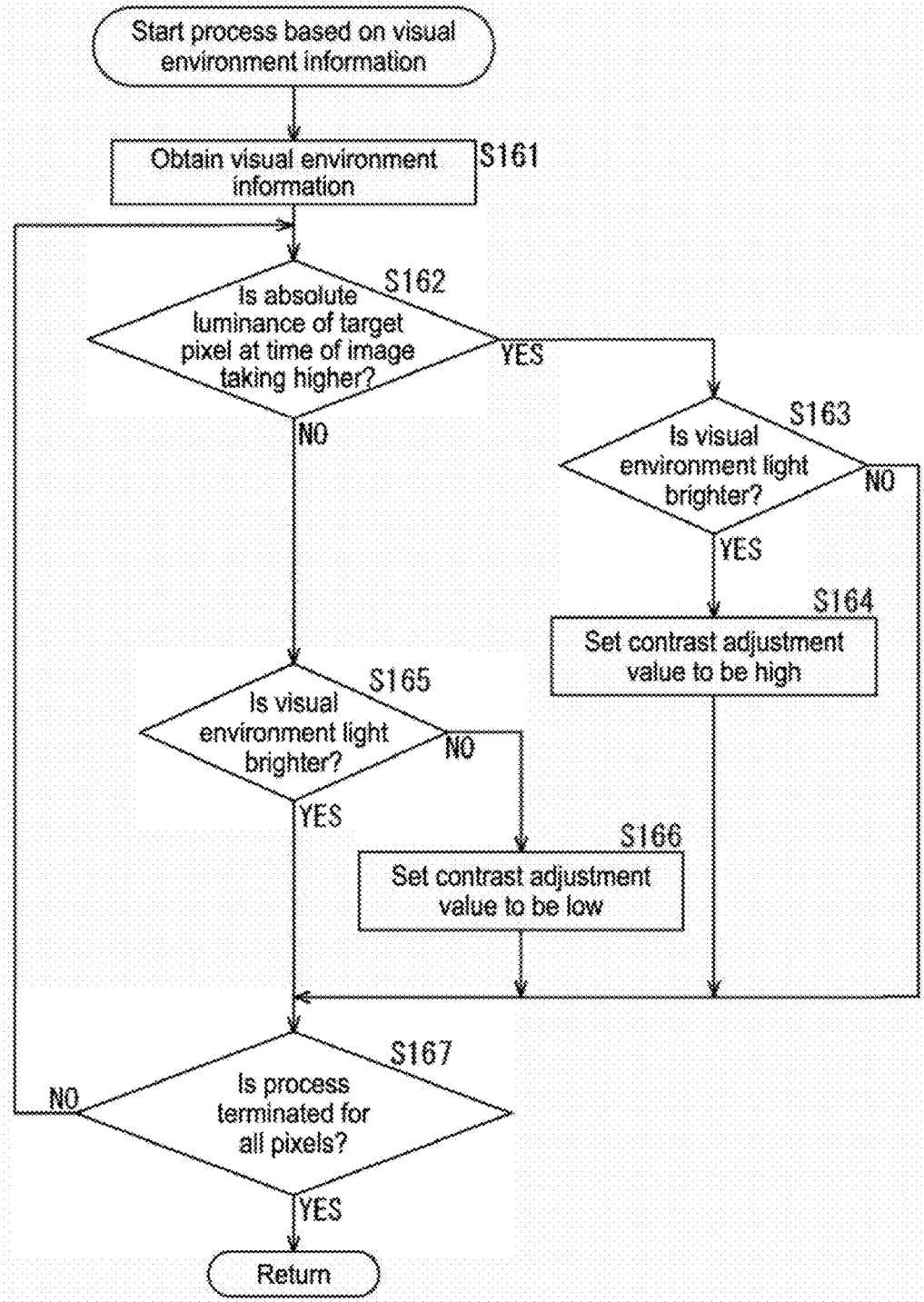
FIG. 15 A flowchart for explaining a process based on visual environment information.

Subsequently, with reference to a flowchart shown in FIG. 15, a description will be given on a process based on the visual environment information in Step S103 of FIG. 13.

In Step S161, the visual environment information analysis unit 25 obtains and analyzes, as information relating to the visual environment, which is an environment at a time of viewing an image, information of visual environment light, for example. The visual environment information analysis unit 25 supplies the analyzed information of the visual environment light to the characteristic control unit 26 as the visual environment parameter.

To the characteristic control unit 26, from the subject characteristic analysis unit 23, absolute luminance information of the image at a time of image taking is estimated and supplied. In Step S162, the characteristic control unit 26 determines whether the absolute luminance of a target pixel at the time of image taking is higher than a predetermined luminance value or not. In Step S162, in a case where it is determined that the absolute luminance of the target pixel at the time of image taking is higher than the predetermined luminance value, the process exceeds to Step S163.

In Step S163, the characteristic control unit 26 refers to the visual environment parameter from the visual environment information analysis unit 25, thereby determining whether the visual environment light is brighter than a predetermined value or not. In Step S163, in a case where it is determined that the visual environment light is brighter, the process proceeds to Step S164. In this case, because there is a possibility that a dark image may be seen, in Step S164, the characteristic control unit 26 controls the image synthesis unit 27 to set contrast adjustment value to be higher as the material feel control.

In Step S163, in a case where it is determined that the visual environment light is darker, Step S164 is skipped, and the process proceeds to Step S167.

In Step S162, in a case where it is determined that the absolute luminance of the target pixel at the time of image taking is lower, the process proceeds to Step S165. In Step S165, the characteristic control unit 26 refers to the visual environment parameter from the visual environment information analysis unit 25, thereby determining whether the visual environment light is brighter than a predetermined value or not.

In Step S165, in a case where it is determined that the visual environment light is darker, the process proceeds to Step S166. In Step S166, the characteristic control unit 26 controls the image synthesis unit 27 to set the contrast adjustment value to be lower as the material feel control.

In Step S165, in a case where it is determined that the visual environment light is brighter, Step S166 is skipped, and the process proceeds to Step S167.

In Step S167, the characteristic control unit 26 determines whether the adjustment of the reflection characteristic is terminated or not for all the pixels.

In Step S167, in a case where it is determined that the process is terminated for all the pixels, the process based on the visual environment information is terminated. In Step S167, in a case where it is determined that the process is not terminated for all the pixels yet, the process returns to Step S162, and subsequent steps are repeatedly performed.

As described above, by the visual environment, the contrast adjustment and the adjustment of the reflection characteristic of the image are made, and thus the material feel of the image of the subject is controlled. As a result, in the image, illumination light is optimized, shininess is improved, and transparency is reproduced.

Figure 16:
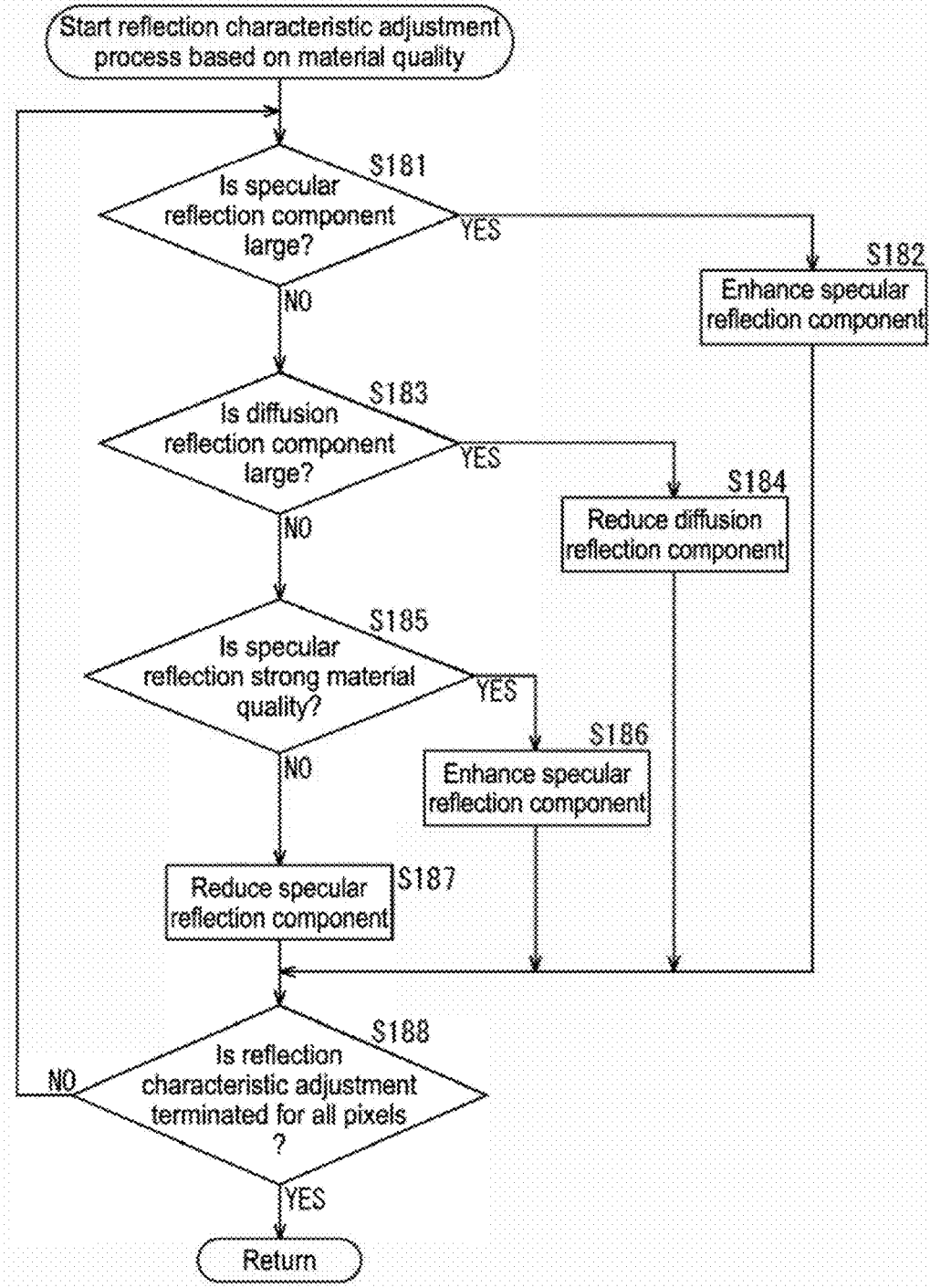
FIG. 16 A flowchart for explaining a reflection characteristic adjustment process based on a material quality.

Subsequently, with reference to a flowchart shown in FIG. 16, a description will be given on a reflection characteristic adjustment process based on the material quality in Step S104 of FIG. 13.

In Step S181, on a basis of information relating to the reflection characteristic of the subject from the characteristic information integrating unit 24, the characteristic control unit 26 determines whether the specular reflection component is large or not. In Step S181, in a case where it is determined that the specular reflection component is large, the process proceeds to Step S182.

In Step S182, the characteristic control unit 26 determines that, as the material feel control, the specular reflection component is enhanced. In Step S181, in a case where it is determined that the specular reflection component is small, the process proceeds to Step S183.

In Step S183, the characteristic control unit 26 determines whether a diffusion reflection component is large or not. In Step S183, in a case where it is determined that the diffusion reflection component is large, the process proceeds to Step S184. In Step S184, the characteristic control unit 26 determines that, as the material feel control, the diffusion reflection component is reduced.

In Step S183, in a case where it is determined that the diffusion reflection component is small, the process proceeds to Step S185.

In Step S185, on a basis of information of the material quality of the subject integrated by the characteristic information integrating unit 24, the characteristic control unit 26 determines whether the specular reflection is a strong material quality or not. In Step S185, in a case where it is determined that the specular reflection is the strong material quality, the process proceeds to Step S186. In Step S186, the characteristic control unit 26 determines that, as the material feel control, the specular reflection component is enhanced.

In Step S185, in a case where it is determined that the specular reflection is not the strong material quality, the process proceeds to Step S187. In Step S187, the characteristic control unit 26 determines that, as the material feel control, the specular reflection component.

In Step S188, the characteristic control unit 26 determines whether the reflection characteristic adjustment is terminated or not for all the pixels.

In Step S188, in a case where it is determined that the reflection characteristic adjustment is terminated for all the pixels, the reflection characteristic adjustment process is terminated. In Step S188, in a case where it is determined that the reflection characteristic adjustment is not yet terminated for all the pixels, the process returns to Step S181, and subsequent steps are repeatedly performed.

As described above, in accordance with the material quality of the subject, the reflection characteristic adjustment of the image is made, and thus the material feel of the image of the subject is controlled. As a result, in the image, illumination light is optimized, shininess is improved, and transparency is reproduced.

Figure 17:
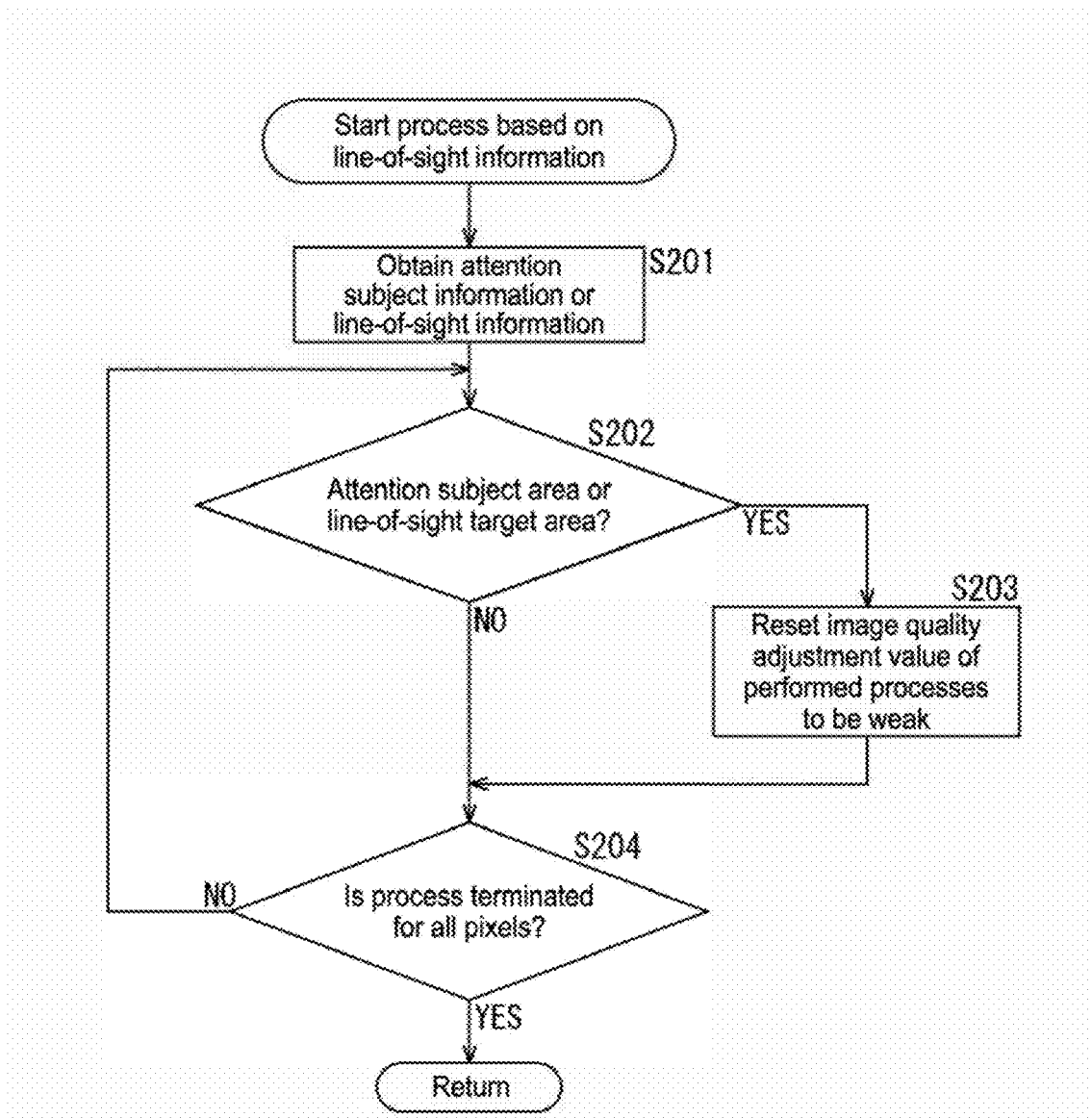
FIG. 17 A flowchart for explaining a process based on line-of-sight information.

Subsequently, with reference to a flowchart shown in FIG. 17, a description will be given on a process based on line-of-sight information in Step S107 of FIG. 13.

In Step S201, as visual environment information, the visual environment information analysis unit 25 obtains and analyzes, for example, attention subject information or line-of-sight information. The visual environment information analysis unit 25 supplies the analyzed visual environment information to the characteristic control unit 26 as the visual environment parameter.

In Step S202, the characteristic control unit 26 determines whether a target pixel is one of an attention subject area and a line-of-sight target area or not. In Step S202, in a case where it is determined that the target pixel is one of the attention subject area and the line-of-sight target area, the process proceeds to Step S203.

In Step S203, the characteristic control unit 26 controls the image synthesis unit 27 to reset the image quality adjustment value of the performed processes (that is, processes based on the visual environment information, the reflection characteristic, and the line-of-sight information) to be weaker, as the material feel control.

In Step S202, in a case where it is determined that the target pixel not one of the attention subject area and the line-of-sight target area, Step S203 is skipped, and the process proceeds to Step S204.

In Step S204, the characteristic control unit 26 determines whether the process is terminated for all the pixels or not.

In Step S204, in a case where it is determined that the process is terminated for all the pixels, the process based on the line-of-sight information is terminated. In Step S204, in a case where it is determined that the process is not terminated for all the pixels, the process returns to Step S202, and subsequent steps are repeatedly performed.

Through the processes described above, in the present technology, the physical characteristic parameters (geometry, reflection characteristic, lighting, and the like) related to the subject are measured, and the characteristics are controlled, thereby making it possible to improve the video quality.

At the time of the reflection characteristic estimation, the highlight area is detected, so it is possible to detect and enhance the low chroma, high luminance, small area part which cannot be detected and enhanced by the reflection characteristic estimation. Further, at this time, the highlight area detection is performed by using the specular reflection component, so a boundary or an excessive detection is not caused.

Further, at the time of the characteristic control, the limit process based on an input and output difference is performed. Thus, it is possible to make the boundary of the specular reflection component and the highlight area component less prominent, and suppress dapples, excessive enhancement, and gradation collapse.

At this time, the area count is performed for the area where the difference between the input image and the enhancement result is large, and only the large area part is subjected to the limit process. Thus, it is possible to perform such image making that projection of a small area is tolerate, and only the excessive enhancement for the large area is suppressed. Further, it is possible to change the limit value depending on the value of the input image, so gradation collapse or gradation inversion is unlikely to occur. Further, the area count is performed, thereby changing the limit process locally, so it is unnecessary to weaken the enhancement entirely, which allows optimal enhancement.

Further, the shadow control is performed, so a dynamic range in an object is increased as compared to the process of only the specular reflection enhancement, and shininess and transparency are improved. The process is performed for the peripheral area of the area where white is saturated, so shininess and transparency are improved even in the area with no specular reflection enhancement effect.

It should be noted that the present technology can be applied to an image processing apparatus, a television apparatus, a projector, and a video system including those, for example.

<Second Embodiment>
[Personal Computer]

The series of processes described above can be performed by hardware or software. In a case where the series of processes are performed by software, programs that constitute the software are installed in a computer. Here, examples of the computer include a computer incorporated in dedicated hardware and a general-purpose personal computer capable of executing various functions by installing various programs.

Figure 18:
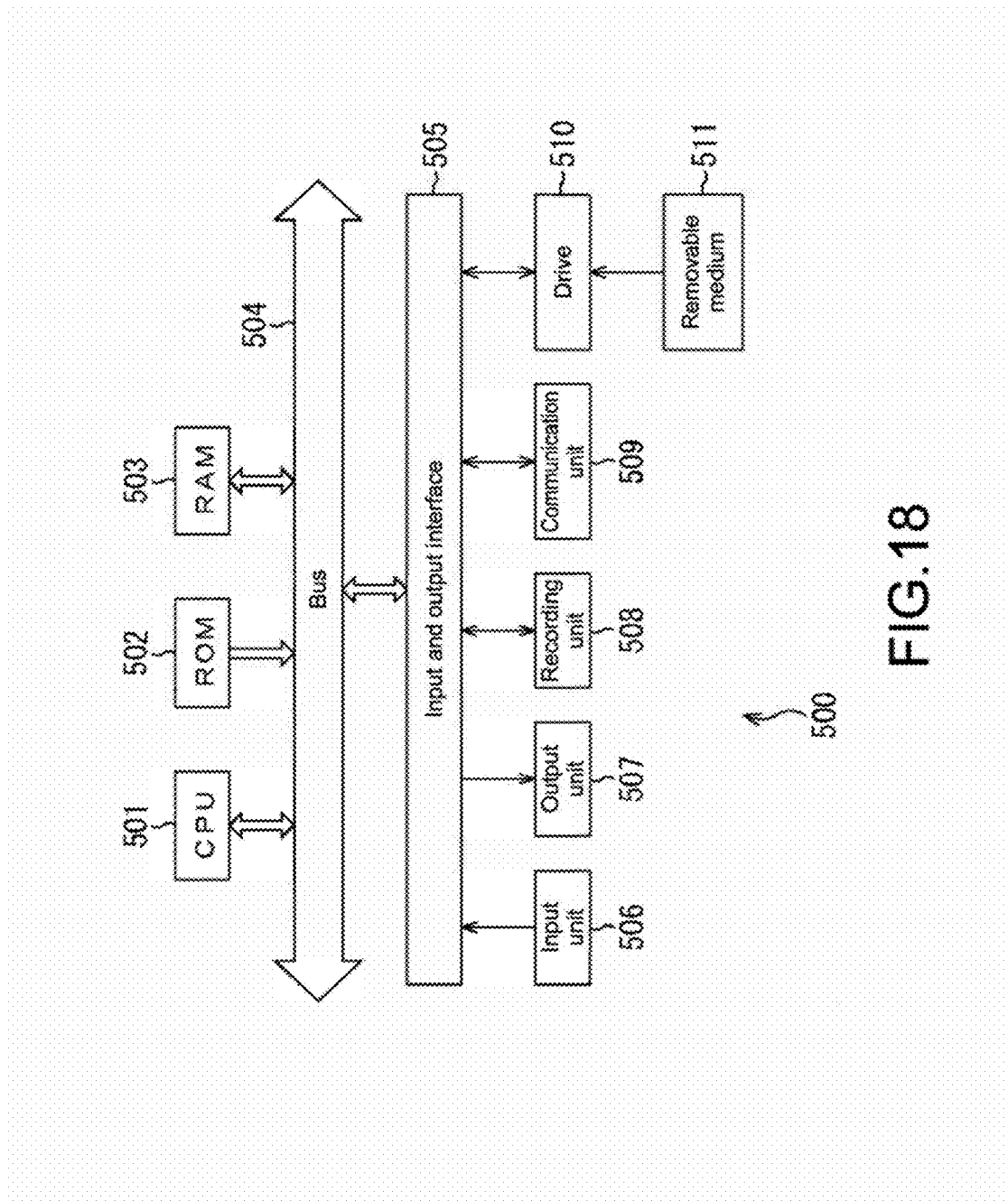
FIG. 18 A block diagram showing a main configuration example of a personal computer.

FIG. 18 is a block diagram showing a configuration example of hardware of a personal computer that performs the series of processes described above by programs.

In a personal computer 500, a CPU (Central Processing Unit) 501, a ROM (Read Only Memory) 502, and a RAM (Random Access Memory) 503 are connected to each other with a bus 504.

To the bus 504, an input and output interface 505 is further connected. To the input and output interface 505, an input unit 506, an output unit 507, a storage unit 508, a communication unit 509, and a drive 510 are connected.

The input unit 506 is constituted of a keyboard, a mouse, a microphone, or the like. The output unit 507 is constituted of a display, a speaker, or the like. The storage unit 508 is constituted of a hard disk, a nonvolatile memory, or the like. The communication unit 509 is constituted of a network interface or the like. The drive 510 drives a removable medium 511 such as a magnetic disk, an optical disc, a magneto optical disk, a semiconductor memory.

In the personal computer 500 configured as described above, for example, the CPU 501 loads programs stored storage unit 508 to the RAM 503 through the input and output interface 505 and the bus 504 and executes the programs. As a result, the series of processes described above are performed.

The programs executed by the computer (CPU 501) can be recorded in the removable medium 511 and provided. For example, the removable medium 511 is a magnetic disk (including a flexible disk), an optical disc (CD-ROM (Compact Disc-Read Only Memory), a DVD (Digital Versatile Disc), or the like), a magneto optical disk, or a package medium or the like constituted of a semiconductor memory or the like. Further, alternatively, the programs can be provided via a wired or wireless transmission medium such as a local area network, the Internet, and digital satellite broadcasting.

In the computer, the programs can be installed in the storage unit 508 through the input and output interface 505 by loading the removable medium 511 to the drive 510. Further, the programs can be received by the communication unit 509 via a wired or wireless transmission medium and installed in the storage unit 508. Alternatively, the programs can be installed in advance in the ROM 502 or the storage unit 508.

It should be noted that the programs executed by the computer may be programs, processing of which is performed on a time-series basis in the order described in this description, or may be programs, processing of which is performed in parallel or in necessary stages, for example at a time of being called.

Further, in this description, the steps describing the programs to be recorded in a recording medium includes processing performed on a time-series basis in the order described, and includes processing performed in parallel or individually even if the processing is not necessarily performed on the time-series basis.

Further, in this description, the system indicates an overall apparatus constituted of a plurality of devices.

Further, in the above, the configuration described as one apparatus (or processing unit) may be divided into a plurality of apparatuses (or processing units). Conversely, the configuration described as the plurality of apparatuses (or processing units) in the above may be combined into one apparatus (or processing unit). Further, to the configuration of the apparatuses (or respective processing units), a configuration other than the configuration described above may of course be added. Further, a part of a configuration of an apparatus (or processing unit) may be included in a configuration of another apparatus (or another processing unit), if the configuration and operation as the entire system are substantially the same. That is, the present technology is not limited to the above embodiments, and can be variously changed without departing from the gist of the present technology.

The desirable embodiments of the present disclosure are described above in detail with reference to the attached drawings, but the present disclosure is not limited to such examples. It is obvious that persons skilled in the art can conceive various change examples or modification examples within the range of the technical idea described in the claims, and of course, it is understood that those belong to the technical range of the present disclosure.

It should be noted that, the present technology can take the following configuration.

(1) An image processing apparatus, including:
a reflection characteristic estimation unit that estimates a reflection characteristic of a subject of an image;
a highlight area detection unit that detects a highlight area in the image by using a reflection characteristic estimation result estimated by the reflection characteristic estimation unit; and
a material feel control unit that controls a material feel of the subject in the image by performing a limit process on a basis of the reflection characteristic estimation result and a highlight area detection result detected by the highlight area detection unit with respect to an image in which a reflection area and a highlight area are enhanced, the limit process being based on a difference between the image and the image in which the reflection area and the highlight area are enhanced.

(2) The image processing apparatus according to (1), in which
the reflection characteristic estimation result obtained by the reflection characteristic estimation unit is information indicating that the reflection characteristic of the subject is a strong specular reflection component.

(3) The image processing apparatus according to (1) or (2), in which the highlight area detection unit performs detection with an area that satisfies a low specular reflection component area, a high luminance area, and a low chroma area as the highlight area.

(4) The image processing apparatus according to any one of (1) to (3), in which
the highlight area detection unit performs detection with an area having a small area which is not excluded by performing area count as the highlight area.

(5) The image processing apparatus according to any one of (1) to (4), in which
the material feel control unit includes
an enhancement process unit that enhances the reflection area and the highlight area on a basis of the reflection characteristic estimation result and the highlight area detection result detected by the highlight area detection unit, and
a limit process unit that performs a limit process with respect to the image in which the reflection area and the highlight area are enhanced, the limit process being based on a difference between the image and the image in which the reflection area and the highlight area are enhanced.

(6) The image processing apparatus according to (5), in which
the limit process unit performs the limit process by calculating a suppression gain that suppression is weak with respect to a small area part, and suppression is strong with respect to a large area part on a basis of a result of area count for pixels that the difference exceeds a predetermined limit straight line, and using the calculated suppression gain.

(7) The image processing apparatus according to (6), in which
the limit process unit performs the limit process by using a different limit straight line from the predetermined limit straight line.

(8) The image processing apparatus according to (7), in which
the different limit straight line has a limit value changed by an input value.

(9) The image processing apparatus according to (6), in which
the limit process unit performs the limit process by using the predetermined limit straight line.

(10) The image processing apparatus according to any one of (5) to (9), in which
the material feel control unit further includes
a shadow control unit that performs shadow control to lower a luminance around the reflection area and highlight area enhanced in the image.

(11) The image processing apparatus according to (10), in which
the shadow control unit performs the shadow control to lower a luminance around the reflection area and highlight area enhanced in the image by lowering a luminance around a part having a large difference between the image and the image for which the limit process is performed.

(12) The image processing apparatus according to (11), in which
the shadow control unit calculates an application gain to be set strong for the part having the large difference, and performs the shadow control by using the calculated application gain.

(13) The image processing apparatus according to (12), in which the shadow control unit performs the shadow control with respect to a luminance lower than a drawing start point set by a user.

(14) The image processing apparatus according to (13), in which the shadow control unit performs the shadow control with respect to a luminance higher than a limit straight line for the shadow control.

(15) An image processing method, including:

by an image processing apparatus, estimating a reflection characteristic of a subject of an image;

detecting a highlight area in the image by using an estimated reflection characteristic estimation result; and controlling a material feel of the subject in the image by performing a limit process on a basis of the reflection characteristic estimation result and a detected highlight area detection result with respect to an image in which a reflection area and a highlight area are enhanced, the limit process being based on a difference between the image and the image in which the reflection area and the highlight area are enhanced.

REFERENCE SIGNS LIST 1 measurement and estimation block
2 real world modeling block
3 material feel control block
4 rendering and retouch block
11 image processing apparatus
21 image-taking environment information obtaining unit
22 image-taking environment information analysis unit
23 subject characteristic analysis unit
24 characteristic information integrating unit
25 visual environment information analysis unit
26 characteristic control unit
27 image synthesis unit
31 reflection characteristic estimation unit
32 highlight area detection unit
41 specular reflection enhancement unit
42 limit process unit
43 shadow control unit
61 input image
62 highlight area gain
63 small area limit gain
64 highlight enhancement gain
71 input image
72 output image
73 area count
81 to 83 graph
74 area count
91 to 93 graph
101 input image
102 specular reflection component
103 highlight area detection result

The invention claimed is:

1. An image processing apparatus, comprising:
a central processing unit (CPU) configured to:
estimate a reflection characteristic of a subject of a first image and output a reflection characteristic estimation result;
detect a highlight area in the first image based on the reflection characteristic estimation result and output a highlight area detection result;
enhance each of a reflection area in the first image based on the reflection characteristic estimation result, and the highlight area in the first image based on the highlight area detection result;
output a second image that comprises the enhanced reflection area and the enhanced highlight area;
execute a limit process based on the reflection characteristic estimation result and the highlight area detection result with respect to the second image, wherein
the limit process corresponds to a process of suppression of a degree of enhancement of the reflection area and the highlight area, and
the limit process is further based on a difference between the first image and the second image;
resynthesize the first image based on the limit process; and
output the resynthesized image.

2. The image processing apparatus according to claim 1, wherein the reflection characteristic estimation result indicates that the reflection characteristic of the subject is a strong specular reflection component.

3. The image processing apparatus according to claim 1, wherein the CPU is further configured to detect an area, that satisfies a low specular reflection component area, a high luminance area, and a low chroma area, as the highlight area.

4. The image processing apparatus according to claim 3, wherein the CPU is further configured to execute an area count to detect among, a small area and a large area, the small area as the highlight area.

5. The image processing apparatus according to claim 1, wherein
the CPU is further configured to execute the limit process based on a calculation of a suppression gain, wherein
the suppression gain is weak with respect to a small area part, and the suppression gain is strong with respect to a large area part, and
the suppression gain with respect to the small area part and the large area part is determined based on a result, of area count for pixels, that the difference exceeds a specific limit straight line, and the calculated suppression gain.

6. The image processing apparatus according to claim 5, wherein the CPU is further configured to execute the limit process based on utilization of a different limit straight line from the specific limit straight line.

7. The image processing apparatus according to claim 6, wherein the different limit straight line has a limit value changeable based on an input value.

8. The image processing apparatus according to claim 5, wherein the CPU is further configured to execute the limit process based on utilization of the specific limit straight line.

9. The image processing apparatus according to claim 1, wherein the CPU is further configured to execute shadow control to lower a first luminance around the enhanced reflection area and the enhanced highlight area in the second image.

10. The image processing apparatus according to claim 9, wherein the CPU is further configured to execute the shadow control to lower the first luminance around the enhanced reflection area and the enhanced highlight area in the second image based on decrease in the first luminance around a part having the difference between the first image and the second image.

11. The image processing apparatus according to claim 10, wherein the CPU is further configured to:
calculate an application gain that is set strong for the part having the difference, and
execute the shadow control based on the calculated application gain.

12. The image processing apparatus according to claim 11, wherein the CPU is further configured to execute the shadow control with respect to a second luminance lower than a drawing start point.

13. The image processing apparatus according to claim 12, wherein the CPU is further configured to execute the shadow control with respect to a third luminance that is higher than a limit straight line for the shadow control.

14. An image processing method, comprising:

in an image processing apparatus:

estimating, by a central processing unit (CPU) of the image processing apparatus, a reflection characteristic of a subject of a first image and outputting a reflection characteristic estimation result;

detecting, by the CPU, a highlight area in the first image based on the reflection characteristic estimation result and outputting a highlight area detection result;

enhancing, by the CPU, each of a reflection area in the first image based on the reflection characteristic estimation result, and the highlight area in the first image based on the highlight area detection result;

outputting, by the CPU, a second image that comprises the enhanced reflection area and the enhanced highlight area;

executing, by the CPU, a limit process based on the reflection characteristic estimation result and the highlight area detection result with respect to the second image, wherein the limit process corresponds to a process of suppression of a degree of enhancement of the reflection area and the highlight area, and the limit process is further based on a difference between the first image and the second image;

resynthesizing, by the CPU, the first image based on the limit process; and outputting, by the CPU, the resynthesized image.

* * * * *